US009151934B2

(12) United States Patent
Saito et al.

(10) Patent No.: US 9,151,934 B2
(45) Date of Patent: Oct. 6, 2015

(54) INFRARED OPTICAL SYSTEM AND INFRARED IMAGING APPARATUS

(75) Inventors: Masahiro Saito, Kanagawa (JP); Hidetoshi Kabasawa, Saitama (JP)

(73) Assignee: SONY CORPORATION, Tokyo (JP)

( * ) Notice: Subject to any disclaimer, the term of this patent is extended or adjusted under 35 U.S.C. 154(b) by 328 days.

(21) Appl. No.: 13/618,084

(22) Filed: Sep. 14, 2012

(65) Prior Publication Data

US 2013/0083200 A1    Apr. 4, 2013

(30) Foreign Application Priority Data

Oct. 4, 2011   (JP) .................................. 2011-220408

(51) Int. Cl.
*G02B 13/14* (2006.01)
*G02B 13/18* (2006.01)
*G02B 13/16* (2006.01)

(52) U.S. Cl.
CPC ................ *G02B 13/18* (2013.01); *G02B 13/14* (2013.01)

(58) Field of Classification Search
CPC ............. G02B 13/008; G02B 13/0035; G02B 13/004; G02B 13/0055; G02B 13/14; G02B 13/146; G02B 13/18
USPC ......... 348/E9.022, 291; 359/201.1, 343, 355, 359/356, 357, 59, 365
See application file for complete search history.

(56) References Cited

U.S. PATENT DOCUMENTS

| 3,160,700 | A * | 12/1964 | Snyder .......................... 359/356 |
| 6,493,155 | B1 * | 12/2002 | Lee et al. ...................... 359/742 |
| 2004/0051957 | A1 * | 3/2004 | Liang ............................. 359/656 |
| 2004/0240080 | A1 * | 12/2004 | Matsui et al. ................. 359/754 |
| 2007/0070523 | A1 * | 3/2007 | Noda ............................. 359/689 |
| 2007/0153387 | A1 * | 7/2007 | Pawlowski et al. ........... 359/565 |

FOREIGN PATENT DOCUMENTS

| JP | 10-301024 | 11/1998 |
| JP | 2001-290073 | 10/2001 |
| JP | 2008-128913 | 6/2008 |
| JP | 2009-063942 | 3/2009 |
| JP | 2010-039243 | 2/2010 |

OTHER PUBLICATIONS

Swanson, Gary J., and Wilfrid B. Veldkamp. "Diffractive optical elements for use in infrared systems." Optical Engineering 28.6 (1989): 286605-286605.*

Japanese Office Action issued May 19, 2015, for corresponding Japanese Appln. No. 2011-220408.

* cited by examiner

*Primary Examiner* — Sath V Perungavoor
*Assistant Examiner* — Clifford Hilaire
(74) *Attorney, Agent, or Firm* — K&L Gates LLP

(57) ABSTRACT

Provided is an infrared optical system including: three lenses of a first lens, a second lens, and a third lens that are provided from an object side to an image-surface side, the first and third lenses being each configured as a spherical lens made of an inorganic material and having a positive refractive power, the second lens being configured as a meniscus lens made of a resin material and having aspherical surfaces; and an aperture stop that is provided between any two of the first to third lenses.

14 Claims, 23 Drawing Sheets

Transmittance of polyethylene

Transmittance of lens in its entirety
in response to change of optical path length
of outermost light rays in lens

FIG.7

| | Surface number | Curvature radius (mm) | Material | Lens spacing (mm) | Eccentricity | A4 | A6 | A8 | A10 | A12 |
|---|---|---|---|---|---|---|---|---|---|---|
| Object | S0 | Infinite | | 9000 | | | | | | |
| First lens | S1 | 67.71 | Si | 1.495 | | | | | | |
| | S2 | Infinite | | 1.97 | | | | | | |
| Aperture stop | S3 | Infinite | | 3.967 | | | | | | |
| Second lens | S4 | −2.215 | PE | 0.5 | −1.263 | 6.615E-03 | −2.727E-04 | 7.087E-06 | −1.069E-07 | 7.030E-10 |
| | S5 | −2.491 | | 8.807 | −1.477 | 4.464E-03 | −1.417E-04 | 2.763E-06 | −3.140E-08 | 1.707E-10 |
| Third lens | S6 | 34.842 | Si | 2.285 | | | | | | |
| | S7 | Infinite | | 7.418 | | | | | | |
| CG | S8 | Infinite | Si | 1 | | | | | | |
| | S9 | Infinite | | 0.95 | | | | | | |
| Image surface | S10 | Infinite | | | | | | | | |

FIG.10

| | Surface number | Curvature radius (mm) | Material | Lens spacing (mm) | Eccentricity | A4 | A6 | A8 | A10 |
|---|---|---|---|---|---|---|---|---|---|
| Object | S0 | | | 9000 | | | | | |
| First lens | S1 | 46.564 | Si | 1.351 | | | | | |
| | S2 | 80 | | 5.405 | | | | | |
| Second lens | S3 | -3.717 | PE | 0.45 | | | | | |
| | S4 | -4.528 | | 0 | -1.547 | -3.015E-03 | -8.421E-05 | 1.087E-06 | -5.591E-09 |
| Aperture stop | S5 | Infinite | | 4.429 | -1.804 | -3.194E-03 | -7.964E-05 | 1.007E-06 | -5.064E-09 |
| Third lens | S6 | -370.217 | Si | 2.201 | | | | | |
| | S7 | -30.568 | | 12.099 | | | | | |
| CG | S8 | Infinite | Si | 1 | | | | | |
| | S9 | Infinite | | 0.95 | | | | | |
| Image surface | S10 | Infinite | | | | | | | |

FIG.13

| | Surface number | Curvature radius (mm) | Material | Lens spacing (mm) | Eccentricity | A4 | A6 | A8 | A10 | A12 | A14 |
|---|---|---|---|---|---|---|---|---|---|---|---|
| Object | S0 | | | 9000 | | | | | | | |
| First lens | S1 | 99.6 | Si | 2.4 | | | | | | | |
| | S2 | Infinite | | 4.798 | | | | | | | |
| Second lens | S3 | -3.1 | PE | 0.5 | -1.455 | 2.478E-03 | -5.597E-05 | 6.096E-07 | 2.431E-09 | -1.269E-10 | 8.182E-13 |
| | S4 | -3.449 | | 0.5 | -1.433 | 2.762E-03 | -6.137E-05 | 8.610E-07 | -4.111E-09 | -3.593E-11 | 2.950E-13 |
| Aperture stop | S5 | Infinite | | 5.553 | | | | | | | |
| Third lens | S6 | Infinite | Si | 3.5 | | | | | | | |
| | S7 | -37.4 | | 10.989 | | | | | | | |
| CG | S8 | Infinite | Si | 1 | | | | | | | |
| | S9 | Infinite | | 0.95 | | | | | | | |
| Image surface | S10 | Infinite | | | | | | | | | |

FIG.16

| | Surface number | Curvature radius (mm) | Material | Lens spacing (mm) | Eccentricity | A4 | A6 | A8 | A10 |
|---|---|---|---|---|---|---|---|---|---|
| Object | S0 | | | 9000 | | | | | |
| First lens | S1 | 22.894 | Si | 3.71 | | | | | |
| | S2 | 32.4 | | 1.4 | | | | | |
| Aperture stop | S3 | Infinite | | 2.01 | | | | | |
| Second lens | S4 | 3.998 | PE | 0.5 | -1.449 | -1.622E-03 | -2.308E-06 | 3.643E-07 | -4.341E-09 |
| | S5 | 3.416 | | 7 | -1.400 | -1.246E-03 | 1.540E-06 | 1.104E-07 | -4.884E-10 |
| Third lens | S6 | -259.5 | Si | 3.3 | | | | | |
| | S7 | -27.17 | | 6.013 | | | | | |
| CG | S8 | Infinite | Si | 1 | | | | | |
| | S9 | Infinite | | 0.95 | | | | | |
| Image surface | S10 | Infinite | | | | | | | |

FIG.19

| Surface number | | Curvature radius (mm) | Material | Lens spacing (mm) | Eccentricity | A4 | A6 | A8 | A10 |
|---|---|---|---|---|---|---|---|---|---|
| Object | S0 | | | 80000 | | | | | |
| First lens | S1 | 23.905 | Ge | 3 | | | | | |
| | S2 | 32.864 | | 2.816 | | | | | |
| Aperture stop | S3 | Infinite | | 1.479 | | | | | |
| Second lens | S4 | 3.694 | PE | 0.5 | −1.750 | −1.628E-03 | −2.456E-06 | 4.944E-07 | −6.588E-09 |
| | S5 | 3.131 | | 6.988 | −1.576 | −1.350E-03 | 1.538E-06 | 2.052E-07 | −1.288E-09 |
| Third lens | S6 | Infinite | Ge | 3.2 | | | | | |
| | S7 | −30.6 | | 5.156 | | | | | |
| CG | S8 | Infinite | Si | 1 | | | | | |
| | S9 | Infinite | | 0.95 | | | | | |
| Image surface | S10 | Infinite | | | | | | | |

FIG.22

| | Surface number | Curvature radius (mm) | Material | Lens spacing (mm) | Eccentricity | A4 | A6 | A8 | A10 |
|---|---|---|---|---|---|---|---|---|---|
| Object | S0 | | | 80000 | | | | | |
| First lens | S1 | 22.7 | Si | 3 | | | | | |
| | S2 | 33.8 | | 2.268 | | | | | |
| Aperture stop | S3 | Infinite | | 1.517 | | | | | |
| Second lens | S4 | 3.659 | PE | 0.5 | -1.742 | -1.606E-03 | -2.771E-06 | 4.601E-07 | -5.419E-09 |
| | S5 | 3.115 | | 6.896 | -1.545 | -1.438E-03 | 4.034E-06 | 2.031E-07 | -1.642E-09 |
| Third lens | S6 | Infinite | Si | 3.2 | | | | | |
| | S7 | -30.6 | | 5.678 | | | | | |
| CG | S8 | Infinite | Si | 1 | | | | | |
| | S9 | Infinite | | 0.95 | | | | | |
| Image surface | S10 | Infinite | | | | | | | |

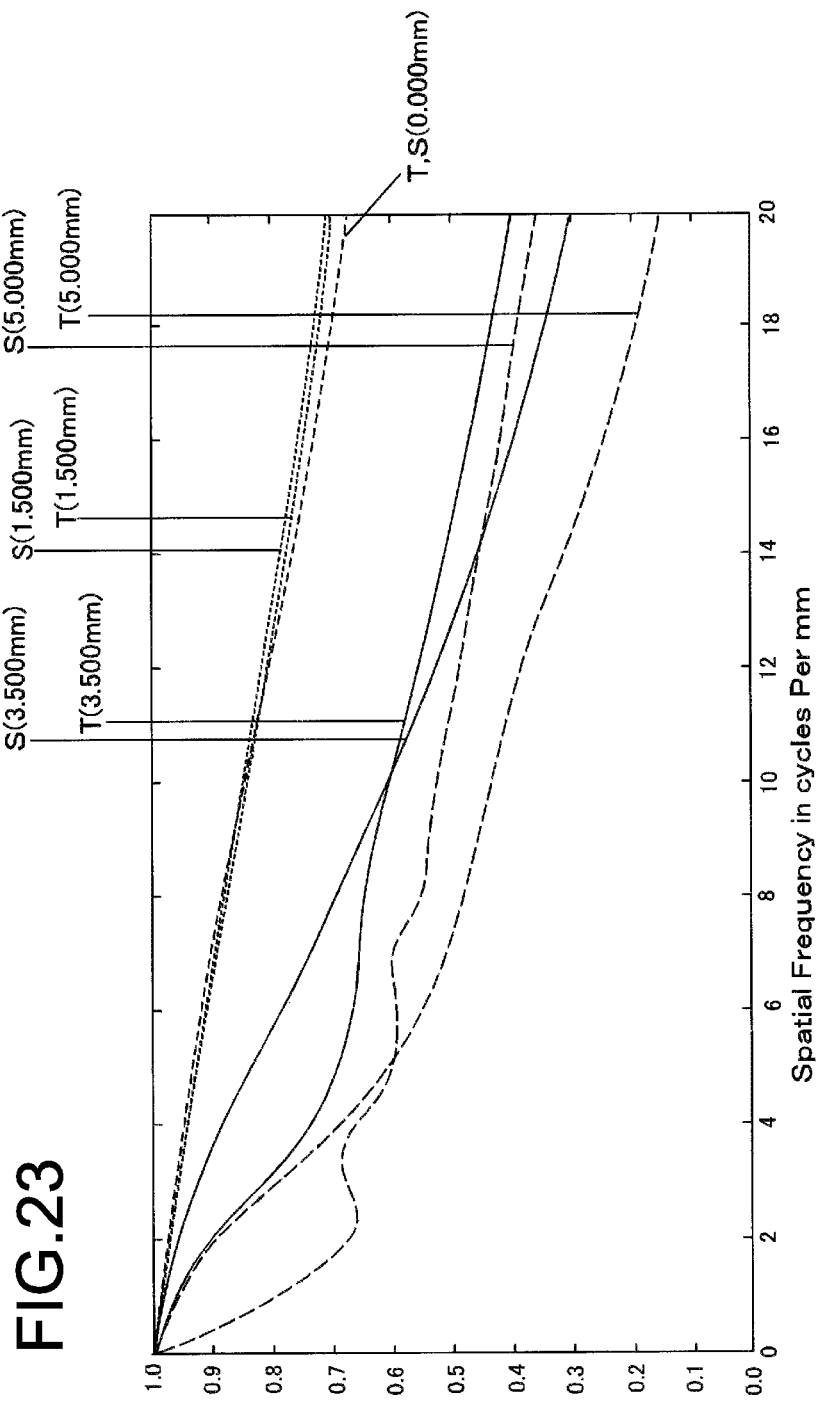

INFRARED OPTICAL SYSTEM AND INFRARED IMAGING APPARATUS

CROSS REFERENCES TO RELATED APPLICATIONS

The present application claims priority to Japanese Priority Patent Application JP 2011-220408 filed in the Japan Patent Office on Oct. 4, 2011, the entire content of which is hereby incorporated by reference.

BACKGROUND

The present application relates to an infrared optical system for use in a system of obtaining infrared images such as thermography or night vision imaging, and to an infrared imaging apparatus using the infrared optical system.

Far infrared rays are in the wavelength range from 8 μm to 12 μm, and are emitted from human beings, animals, and others as heat, i.e., as infrared rays. This makes the far infrared rays popular for use with imaging in dark places or observing temperature distributions, for example.

With an optical system gathering such far infrared rays, a glass lens often used for general visible light is not used due to the low transmittance thereof, and instead, germanium (Ge) is popularly used as a material that passes therethrough the infrared rays well. Germanium has a high refractive index of about 4, and the surface reflectance is thus high but the absorption index is closely zero. As such, with an appropriate antireflective coating, germanium may have the transmittance of 90% or higher.

SUMMARY

The concern here is that germanium is extremely expensive as it is a rare mineral.

Therefore, as an alternative lens material, an inorganic crystalline material is used. The inorganic crystalline material is indeed low in transmittance compared to germanium, but is moderately priced. The inorganic crystalline material includes silicon (Si), zinc sulfide (ZnS), zinc selenide (ZnSe), and chalcogenide glass being a compound of chalcogen and germanium, for example.

However, such materials are indeed inexpensive but have a drawback of a high hardness similarly to germanium. That is, processing of the materials with a high hardness as such takes a long time, for example, and this may cause difficulty in cost reduction. Especially for grinding the materials to be aspherical in shape, the processing time is expected to be long with the use of delicate machinery, and thus the cost increase is not avoided.

As to processing of zinc sulfide and chalcogenide glass, the study has been conducted about the possibility of press forming, but the resulting product of a far infrared lens and an optical system are not yet ready for the low-price supply.

Note that Patent Documents 1 to 3 (Japanese Patent Application Laid-open Nos. 2010-039243, 2009-063942, and 2008-128913) describe the previous examples of an infrared optical system, for example.

Patent Document 1 describes the optical system using three germanium lenses, for example. This optical system shows excellent optical property at the angle of view of 30° or more.

Also in Patent Document 1, the lens is spherical in shape to reduce the processing cost.

However, the material in use is germanium being very expensive, and thus the use thereof does not lead to any inexpensive device.

In Patent Documents 2 and 3, the material in use is zinc sulfide being moderately priced compared to germanium. However, the lens is aspherical in shape to reduce aberration that increases often because the refractive index of zinc sulfide is lower than that of germanium. This is an obstacle for cost reduction in view of the processing difficulty and the processing time.

Moreover, the use of zinc sulfide causes relatively conspicuous chromatic aberration, and thus Patent Documents 2 and 3 both use the diffraction structure for color calibration. However, this is also an obstacle for cost reduction in view of the processing difficulty and the processing time.

It is thus desirable to provide an infrared optical system and an infrared imaging apparatus that show excellent optical property in the far-infrared radiation area of 8 μm to 12 μm, and are implemented at a low cost. For increasing the range of use of a far infrared device, the wide angle of view is desirable, and considering the imaging sensitivity, the optical system with a small number of lenses is desirable. To be more specific, the desirable angle of view is at least more than 25°, and the desirable number of lenses in the optical system is at least no more than three.

According to an embodiment of the present application, an infrared optical system is configured as below.

That is, the infrared optical system according to the embodiment of the present application includes three lenses of a first lens, a second lens, and a third lens that are provided from an object side to an image-surface side.

The first and third lenses are each configured as a spherical lens made of an inorganic material and have a positive refractive power.

The second lens is configured as a meniscus lens made of a resin material and has aspherical surfaces.

Moreover, an aperture stop is provided between any two of the first to third lenses.

According to another embodiment of the present application, an infrared imaging apparatus is configured as below.

That is, the infrared imaging apparatus according to the embodiment of the present application includes the above-described infrared optical system according to the embodiment of the present application, an infrared detection section, and an image signal obtaining section. The infrared detection section is configured to detect an infrared light gathered by the infrared optical system, and the image signal obtaining section is configured to obtain an infrared image signal based on an infrared detection signal obtained by the infrared detection section.

Herein, for realizing a low cost, the effective approach is to reduce the number of lenses for use, and to use lenses each with a smaller number of aspherical surfaces that are difficult to process.

Moreover, for ensuring a certain amount of light for passage, the desirable approach is to reduce the number of lenses in use as described above, or to reduce the lens thickness.

For realizing the excellent optical property, various types of aberration are expected to be controlled appropriately. For aberration correction, the use of aspherical surfaces is effective.

As described above, the optical system according to the embodiment of the present application includes the three lenses of the first lens, the second lens, and the third lens that are provided in order from the object side. The first and third lenses are each a spherical lens made of an inorganic material and have a positive refractive power. The second lens is a meniscus lens made of a resin material and has aspherical surfaces.

Herein, the inorganic material used to form the first and third lenses as such involves a processing cost to shape the lenses to be aspherical irrespective of glass type. In consideration thereof, in the embodiment of the present application, the first and third lenses in use are each a spherical lens, i.e., a lens whose surfaces are both spherical to function as a convex lens, thereby controlling the processing cost not to increase.

The concern here is that, with only two spherical lenses as such, aberration correction is not completely performed in an optical system with a small F number and a wide angle of view. In consideration thereof, aberration correction is performed by using the second lens being an aspherical lens made of a resin material. Such a resin-made lens realizes the aspherical shape at a low cost by injection molding or press forming, for example.

Moreover, the resin material also realizes thickness reduction of the second lens with ease so that a high transmittance (far infrared transmission) is realized with ease as well.

According to the embodiments of the present application, it is possible to provide an infrared optical system and an infrared imaging apparatus that show excellent optical property in the far-infrared radiation area, and are implemented at a low cost.

Additional features and advantages are described herein, and will be apparent from the following Detailed Description and the figures.

BRIEF DESCRIPTION OF THE FIGURES

FIG. 7 is a table of coefficients of lenses in the infrared optical system in Example 1, related to the shape of the lenses (and the aperture), and the lens spacing;

FIG. 10 is a table of coefficients of lenses in the infrared optical system in Example 2, related to the shape of the lenses (and the aperture), and the lens spacing;

FIG. 13 is a table of coefficients of lenses in the infrared optical system in Example 3, related to the shape of the lenses (and the aperture), and the lens spacing;

FIG. 16 is a table of coefficients of lenses in the infrared optical system in Example 4, related to the shape of the lenses (and the aperture), and the lens spacing;

FIG. 19 is a table of coefficients of lenses in the infrared optical system in Example 5, related to the shape of the lenses (and the aperture), and the lens spacing;

FIG. 22 is a table of coefficients of lenses in the infrared optical system in Example 6, related to the shape of the lenses (and the aperture), and the lens spacing; and FIG. 23 is a diagram showing the property of resolving power (MTF) at each image height (0 mm, 1.5 mm, 3.5 mm, and 5.0 mm) in the infrared optical system in Example 6.

DETAILED DESCRIPTION

Hereinafter, an embodiment of the present application will be described.

Note that the description is given in the following order.
1. Infrared Optical System and Infrared Imaging Apparatus as Embodiment
1-1. Configuration of Infrared Imaging Apparatus
1-2. Overview of Infrared Optical System in Embodiment
2. Specific Examples
2-1. Example 1
2-2. Example 2
2-3. Example 3
2-4. Example 4
2-5. Example 5
2-6. Example 6
3. Modification Examples

1. INFRARED OPTICAL SYSTEM AND INFRARED IMAGING APPARATUS AS EMBODIMENT 1-1. Configuration of Infrared Imaging Apparatus FIG. 1 is a block diagram showing the inner configuration of an infrared imaging apparatus 1 as an embodiment of the infrared imaging apparatus of the present application.

Figure 1:
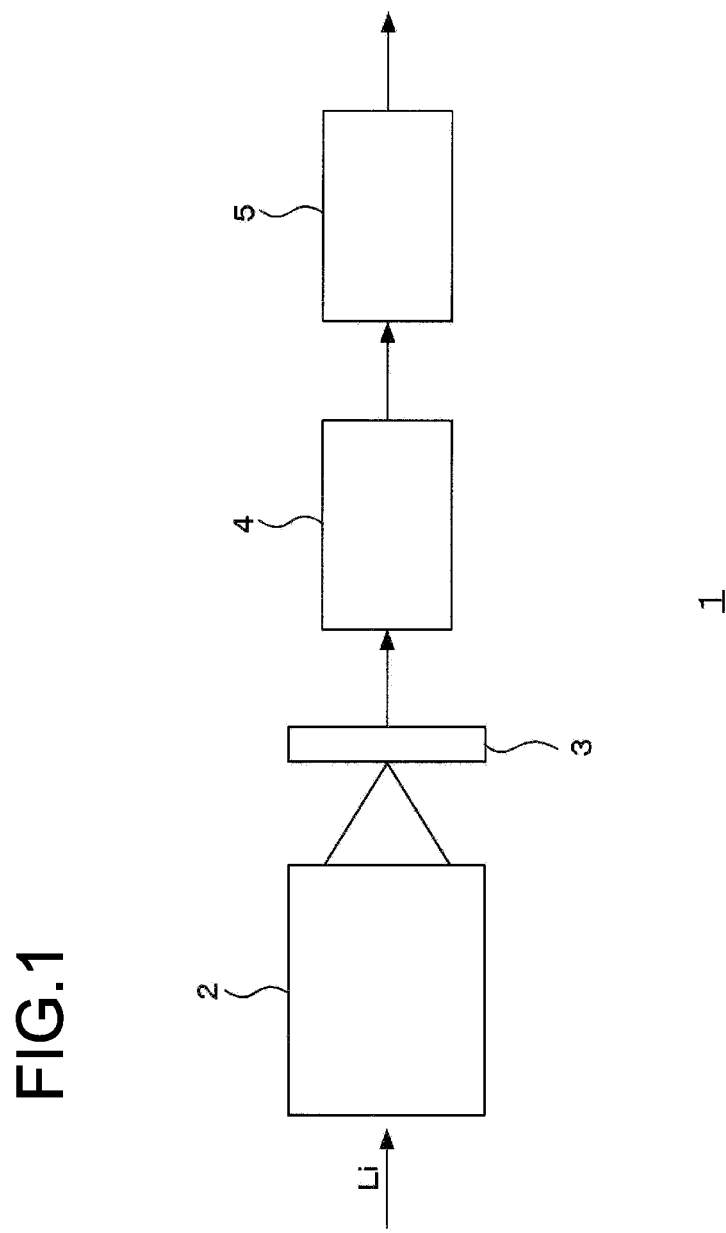
FIG. 1 is a block diagram showing the inner configuration of an infrared imaging apparatus according to an embodiment.

As shown in FIG. 1, the infrared imaging apparatus 1 includes an optical block 2, an image sensor (imager) 3, an image signal obtaining section 4, and an image signal processing section 5.

The optical block 2 shows the infrared optical system as a whole as the embodiment that will be described later. The optical block 2 gathers infrared light (infrared rays) onto the imaging surface (image surface) of the image sensor 3. The infrared light comes from an subject (object), which is denoted as incident light Li in FIG. 1.

The image sensor 3 detects the infrared rays gathered by the optical block 2 as such, thereby obtaining an infrared detection signal corresponding to the infrared rays emitted by the subject.

For obtaining such an infrared detection signal, the image sensor 3 is expected to include an infrared detection element such as pyroelectric element. Alternatively, the infrared detection element for use may also be of a thermopile or bolometer type, for example. The thermopile type is connected with a thermocouple to produce the Seebeck effect, and the bolometer type uses a resistance value change by a temperature increase.

The infrared detection element is not restrictive thereto, and may be of any type as long as the infrared rays are detected thereby.

In the embodiment, the infrared detection element in use is a pyroelectric element.

When the infrared detection element in use is a pyroelectric element as such, the image sensor 3 is provided with a shutter for periodically blocking the infrared rays entering thereto. This is to be ready for the pyroelectric element that does not output a value corresponding to a temperature itself but outputs a value corresponding to a temperature difference (temperature change). That is, the shutter periodically changes the state for the infrared rays between irradiation and blockage so as to intentionally produce a temperature difference. This is to obtain an image with appropriate temperature distribution (infrared image) also for a not-moving object.

Note that, a description specifically about where to form the shutter is given later.

The image signal obtaining section 4 obtains an infrared image signal with the input of an infrared detection signal coming from the image sensor 3. The infrared detection signal herein is obtained on the basis of the infrared detection element described above.

The image signal processing section 5 performs various types of image signal processing on the infrared image signal obtained by the image signal obtaining section 4, e.g., black level correction, pixel defect correction, aberration correction, optical shading correction, lens distortion correction, temperature adjustment, calculation of a distance change, and coding.

The output from the image signal processing section 5 is sent to a display (image display apparatus) and others outside of the imaging apparatus via an interface (not shown), for example.

1-2. Overview of Infrared Optical System in Embodiment

Figure 2:
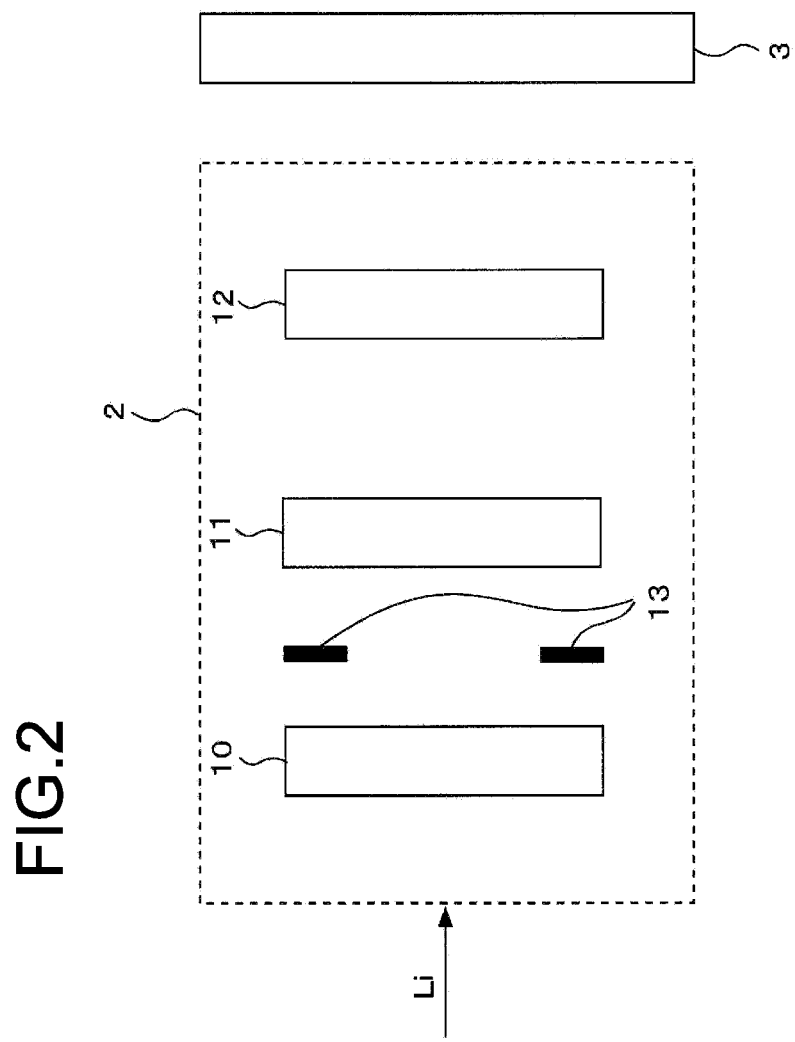
FIG. 2 is a diagram for illustrating the overview of the configuration of an infrared optical system in the embodiment.

FIG. 2 is a diagram for illustrating the overview of the inner configuration of the optical block 2.

Together with the overview of the inner configuration of the optical block 2, FIG. 2 also shows the image sensor 3.

As shown in FIG. 2, the optical block 2 in the embodiment is provided with three lenses of a first lens 10, a second lens 11, and a third lens 12 from the object side to the image-surface side.

The optical block 2 is also provided with an aperture stop 13 between any two of the first to third lenses 10 to 12. FIG. 2 shows an example of forming the aperture stop 13 between the first and second lenses 10 and 11. This is applied also to Examples 1, 4, 5, and 6 that will be described later.

In such an optical block 2 in the embodiment, the first, second, and third lenses 10, 11, and 12, and the aperture stop 13 are provided in the same lens barrel.

In the embodiment, the optical block 2 provided at least with such components, i.e., the first lens 10, the second lens 11, the aperture stop 13, the third lens 12, and the aperture stop 13, is configured as below with the aim of providing thereto the excellent optical property mainly in the far-infrared radiation area (8 μm to 12 μm), and manufacturing the optical block 2 at a low cost.

First of all, the first and third lenses 10 and 12 are each a spherical lens with a positive refractive power (power). These first and second lenses 10 and 12 are also each a spherical lens made of an inorganic material. Specifically in this example, these first and third lenses 10 and 12 are each a spherical lens made of silicon (Si).

The lens made of an inorganic material as such involves a processing cost to be shaped to be aspherical irrespective of glass type. In consideration thereof, in this embodiment, the first and third lenses 10 and 12 in use are each a spherical lens, i.e., a lens whose surfaces are both spherical to function as a convex lens (to obtain the positive refractive power described above), thereby controlling the processing cost not to increase.

Moreover, silicon is a moderately-priced lens material although it is low in infrared transmittance compared to germanium. Also in this sense, an attempt is made for cost reduction.

Herein, the first and third lenses 10 and 12 may be each shaped to be plano-convex or meniscus, which will be described in Examples below.

Further, in the optical block 2 in the embodiment, the second lens 11 in use is a double-sided aspherical lens made of a resin material.

The concern here is that, with only two spherical lenses as such, i.e., the first and third lenses 10 and 12, aberration correction is not completely performed in an optical system with a small F number and a wide angle of view. In consideration thereof, aberration correction is performed by using the second lens 11 being an aspherical lens made of a resin material. Such a resin-made lens realizes the aspherical shape at a low cost by injection molding or press forming, for example.

What is more, the resin material is very inexpensive compared to germanium and the others, and also in this respect, an attempt is made for cost reduction.

Furthermore, the resin material also realizes thickness reduction of the second lens with ease so that a high transmittance (infrared transmission) is realized with ease as well.

As will be described in Examples below, the second lens 11 may be a meniscus lens for use. The meniscus lens is advantageous in terms of thickness reduction, and thus is also advantageous to increase the infrared transmittance.

The concern here is that an unavoidable drawback of the resin-made lens is the deterioration of property by ultraviolet rays.

In consideration thereof, in the embodiment, the resin-made second lens 11 is disposed to be sandwiched between the first and third lenses 10 and 12, which are each made of an inorganic material as described above. These first to third lenses 10 to 12 are accommodated in the same lens barrel.

With this configuration, the lens(es) other than the first and third lenses 10 and 12 disposed at the end portions of the lens barrel are not directly exposed to visible light. Accordingly, with the first and third lenses 10 and 12 each made of a crystalline material low in transmittance in the visible-light radiation area, e.g., silicon described above, the resin-made second lens 10 is effectively protected from the visible light.

This accordingly prevents any possible property deterioration over time, thereby implementing a highly stable infrared optical system.

Carbon black is sometimes mixed in the resin-made lens generally for increasing the resistance to light, i.e., resistance mainly to ultraviolet rays. However, this should be noted that the mixture of carbon black as such causes reduction of the far-infrared transmittance, and the resulting lens is not good for the use of infrared rays.

For accommodating the lenses in the same lens barrel, using the lenses having the same outer diameter is effective. That is, the lenses having the same outer diameter as such all fit in a piece of lens barrel with one inner diameter, thereby leading to easy assembly with control over an eccentricity of the lenses.

In this case, the resin-made second lens 11 may be so shaped that the flange, i.e., the peripheral portion, thereof has a flat portion on both sides of the object and the image surface. In this case, by using the flat portions of the flange as such, the three lenses may be accommodated in the lens barrel at predetermined spacing via a spacer, i.e., configuration in Examples 2 to 6.

With the lens barrel accommodating all the lenses, the lens barrel may be supported by the first and third lenses 10 and 12 each made of silicon or others having a relatively high rigidity. As such, the resin-made second lens 11 with a low rigidity is appropriately protected by damage such as cracking.

In the embodiment, the aperture stop 13 is disposed between any two of the first to third lenses 10 to 12 by insertion as described above.

With the aperture stop 13 provided between any two of the first to third lenses 10 to 12 as such, when an optical system is at a wide angle of view of 25° or more, for example, the first and third lenses 10 and 12 may have almost the same effective diameter for passage of light rays. As such, this prevents either the first or third lens 10 or 12 from becoming a large-diameter lens.

Also in the embodiment, the first and third lenses 10 and 12 are each a silicon-made lens as described above. The concern here is that, with the silicon lens, chromatic dispersion is not apparent compared to other lenses made of inorganic materials. Herein, the Abbe number may be defined tentatively using the refractive index with wavelengths of 8 μm, 10 μm, and 12 μm. Because the Abbe number is the reciprocal value of the chromatic dispersive power, a Si (silicon) lens has the Abbe number of 1510, a Ge (germanium) lens has that of 940, and a ZnS (zinc sulfide) lens has that of 23. These results also show that, with the silicon lens, chromatic dispersion is not apparent.

Herein, the effect of chromatic dispersion is reduced with the reduction of the focal length of the lenses.

In this case, assuming that the imager in use is fixed in size, the focal length only needs to be set to be short for achieving a wide angle of view. Accordingly, for example, with the optical system of the embodiment in which the angle of view is relatively wide as 25° or more, the focal length is set short thereby. To be specific, the focal length in this example is about 18 mm or less.

In this respect and with the use of the silicon lenses with which chromatic dispersion is not apparent, without using any specific mechanism for chromatic aberration correction, e.g., diffraction structure, the optical system in the embodiment appropriately gathers far infrared rays with the wavelength of 8 μm to 12 μm with less influence of chromatic aberration.

Although not shown in FIG. 2, a shutter is inserted into the optical block 2 in this example of using a pyroelectric element as an infrared detection element.

In this example, the shutter is provided where the aperture stop 13 is formed.

With the shutter provided where the aperture stop 13 is formed as such, the light rays coming from an object with various angles of view are shielded (blocked) all at once. This accordingly reduces effectively the variation of amount of light, i.e., the variation of brightness in an infrared image, that is caused on the image sensor 3 due to the opening and closing of the shutter.

More desirably, the shutter is formed where the aperture stop 13 is formed between the first and second lenses 10 and 11 as shown in FIG. 2. With such a configuration, an attempt is made to prevent degradation of the S/N (Signal-to-Noise ratio) in the optical system.

The resin-made second lens 11 generally has a high infrared absorption ratio, and because the absorption ratio is regarded as equal to the emissivity, a large amount of heat comes from the second lens 11. In the infrared imaging apparatus, the heat coming from the optical system toward the imager means the degradation of the S/N. However, with the configuration described above, i.e., the shutter is provided where the aperture stop 13 is formed between the first and second lenses 10 and 11, the heat coming from the second lens 11 is blocked by the shutter so that the output of the image sensor 3 is free of the influence of the heat. That is, even if the second lens 11 in use is a resin lens, the shutter provided on the side closer to the object than the second lens 11 reduces the influence of the heat radiation therefrom on the S/N.

Therefore, even if a signal from the object to the image sensor 3 is almost in the same level as noise from the resin-made second lens 11 to the image sensor 3, the output of the image sensor 3 is not affected thereby.

As described above, the resin-made lens has a high infrared absorption ratio, and thus is with a low infrared transmittance.

In consideration thereof, in this example, the second lens 11 in use is made of polyethylene (PE) whose infrared transmittance is relatively high among other resin materials.

Herein, in consideration of the resistance to heat and impact, the use of high molecular weight polyethylene is desirable.

Moreover, considering that the resin material for use is low in transmittance, forming the second lens 11 to be thin is desirable.

Herein, the transmittance is to decrease with increase of the ray length of light rays passing through the lens. Therefore, for increasing the transmittance, the lens thickness is expected to be set so as to reduce the maximum ray length of infrared rays passing through the lens. The maximum ray length denotes the ray length of light rays whose ray length is the maximum among the light passing through the lens. In other words, the resin-made second lens 11 is configured to reduce the maximum ray length of light rays passing therethrough for image formation.

To be specific, the desirable maximum ray length is found out to be 2.0 mm or less.

In the below, described is the reason for controlling the maximum ray length to be 2.0 mm or less for light rays passing through the second lens 11.

First of all, the properties to be taken into consideration in the infrared optical system are the resolving power and the temperature resolving power.

The resolution is the property of how detailed the image of a target object is formed thereby, and an MTF (Modulation Transfer Function) value is often used as an indicator thereof.

The MTF of the optical system is determined by value based on deterioration of the light-gathering property resulted from aberration, for example. However, in order to evaluate the performance capabilities of the infrared imaging apparatus including the imager, factors of the imager are also considered important, i.e., the pixel pitch, and the sensitivity. This is because, even if the optical system succeeds in light gathering with no aberration, no temperature distribution is detected unless the imager receives rays or electromagnetic waves enough for sensing. This means the transmittance of the optical system is also a factor affecting the MTF of the apparatus in its entirety.

On the other hand, the temperature resolving power is the property of how precise the temperature difference of a target object is measured thereby, and this is an indicator unique to the infrared optical system. As a performance-capability indicator of the infrared imager, there is an NETD (Noise Equivalent Temperature Difference), which indicates a measured temperature difference equivalent to the noise inside of the imager. When such a value is obtained in the entire apparatus, the transmittance of the optical system affects the amount of light entering the imager, or the amount of energy of electromagnetic waves. This thus causes a change of value of the NETD.

As is evident from the above, the transmittance of the optical system greatly affects the performance capabilities of the infrared imaging apparatus.

In the below, estimation is made for the minimum limit of the transmittance expected for each of the lenses.

Figure 3:
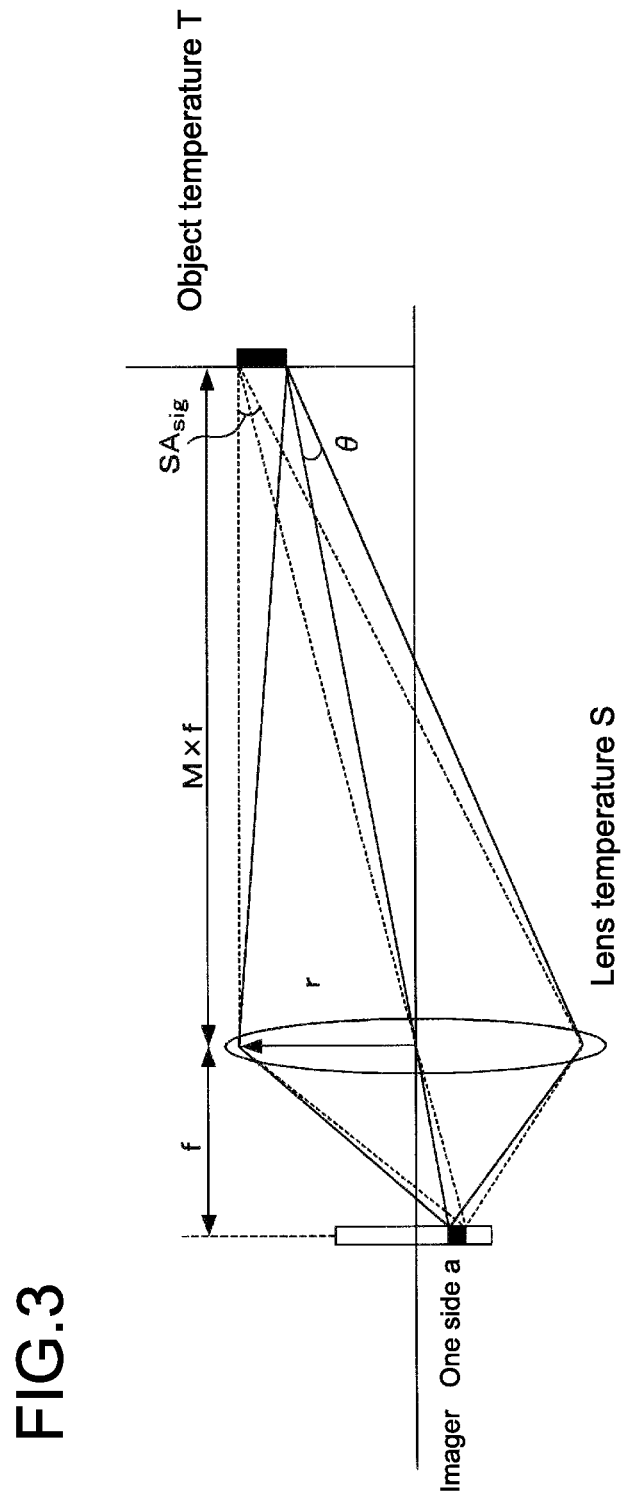
FIG. 3 is a conceptual diagram illustrating the amount of infrared rays for image formation on an imager.

First of all, as shown in FIG. 3, exemplified is the case of light gathering onto the imager with an object having a temperature T via a lens having a temperature of S. In FIG. 3, "f" denotes the focal length of the lens, "M×f" denotes the distance between the object and the lens (where M is a magnification), and "r" denotes the radius of the lens.

Referring to FIG. 3, the solid angle $SA_{sig}$ toward the lens from a micro area on the object satisfies Equation 1, where $\theta$ is the half angle of the circular cone.

$$\tan\theta = \frac{r}{Mf} \quad \text{Equation 1}$$

$$\cos\theta = (1+\tan^2\theta)^{-\frac{1}{2}} \cong 1 - \frac{1}{2}\left(\frac{r}{Mf}\right)^2$$

$$SA_{sig} = 2\pi(1-\cos\theta) = \pi\left(\frac{r}{Mf}\right)^2$$

As to the number of photons $P_{sig}$ entering unit pixels on one side a of the imager, because the photons come from the region on the object whose one side is Ma (M×a). Accordingly, using the Planck's law describing that the radiation amount is proportional to the fourth power of the temperature T[K] of the object, Equation 2 is established, where R is the emissivity of the object, and p is the average transmittance of the lens.

$$P_{sig} \propto R \cdot T^4 \cdot \pi\left(\frac{r}{Mf}\right)^2 \cdot \frac{1}{4\pi} \cdot (Ma)^2 \cdot p = \frac{R \cdot p \cdot T^4}{4}\left(\frac{r \cdot a}{f}\right)^2 \quad \text{Equation 2}$$

Figure 4:
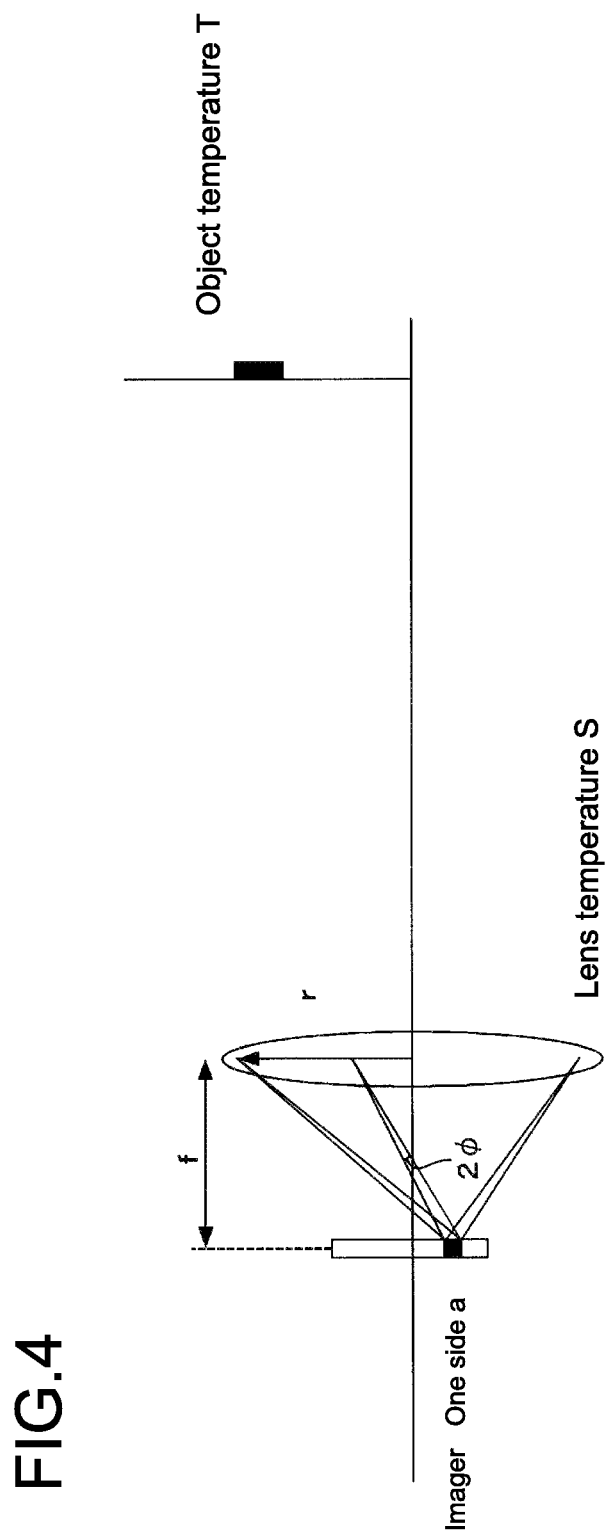
FIG. 4 is a conceptual diagram illustrating the amount of infrared rays entering the imager from a lens.

Referring to FIG. 4, obtained next is the number of photons Plens entering the imager from each point on the lens. As to the solid angle (2ϕ) toward the unit pixels of the imager from a micro area on the lens, Equation 3 is established, where ϕ is the half angle thereof.

$$\tan\phi = \frac{a}{2f} \quad \text{Equation 3}$$

$$\cos\phi = 1 - \frac{1}{2}\left(\frac{a}{2f}\right)^2$$

$$SA_{lens} = 2\pi(1-\cos\theta) = \frac{\pi}{4}\left(\frac{a}{f}\right)^2$$

Moreover, because the lens has the emissivity of (1−p), Equation 4 is established.

$$P_{lens} \propto (1-p) \cdot S^4 \cdot \frac{\pi}{4}\left(\frac{a}{f}\right)^2 \cdot \pi \cdot r^2 = \frac{(1-p) \cdot \pi \cdot S^4}{4}\left(\frac{r \cdot a}{f}\right)^2 \quad \text{Equation 4}$$

With Equations 2 and 4 as above, as to the requirements for the photons from the object to be more than the photons from the lens, Equation 5 is established.

$$P_{sig} \geq P_{lens} \Leftrightarrow \frac{R \cdot p \cdot T^4}{4}\left(\frac{r \cdot a}{f}\right)^2 \geq \frac{(1-p) \cdot \pi \cdot S^4}{16}\left(\frac{r \cdot a}{f}\right)^2 \Leftrightarrow \quad \text{Equation 5}$$

$$p \geq \frac{\pi \cdot S^4}{4R \cdot T^4 + \pi \cdot S^4}$$

In Equation 5, S denotes the temperature of the lens and is 23° C. (296 K), and T denotes the temperature of the target object and is 35° C. (308 K). A substitution is then made as R=0.9 considering that the human skin has the emissivity of about 0.98, and nonmetal materials often have the emissivity in a range from 0.8 to 1.0. As such, in Equation 5, the transmittance expected to the lens is obtained as 42.7%.

As is evident from Equation 5, the higher the temperature T of the measurement target, the minimum limit of the transmittance expected to the lens is reduced.

Figure 5A:
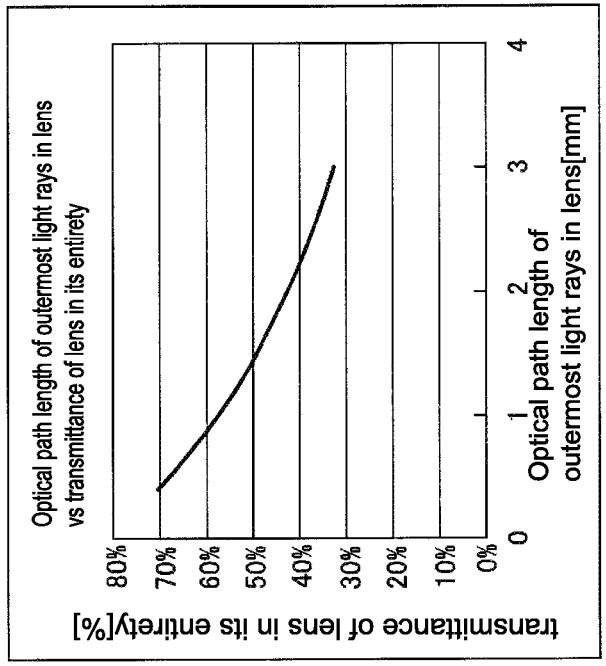
FIG. 5A is a diagram showing how the infrared transmittance of polyethylene is dependent on the plate thickness.

FIG. 5A shows how the infrared transmittance of polyethylene popularly used in the infrared optical system is dependent on the plate thickness. The infrared transmittance herein is measured with the wavelength of 9.7 μm.

By exponential fitting, the transmittance t(d) of polyethylene is expressed by Equation 6 below.

In Equation 6, d is the thickness [mm] of polyethylene.

$$t(d)=0.9 \cdot \exp[-0.7 \cdot d] \quad \text{Equation 6}$$

Herein, the basic physical property of a lens having the image-formation function is "the optical path length of light rays passing through the lens is given by the quadratic function of r, which is the distance from the center of the lens in the radius direction". In consideration thereof, the optical path length opd(r) of light rays entering the lens at such a distance r is expressed by Equation 7, where 0.3 denotes the minimum limit for the center thickness (mm) of the lens under constraints of manufacturing, and h is the optical path length of outer-peripheral light in the lens (that is, the maximum ray length of light rays passing through the lens for image formation).

$$opd(r)=(h-0.3) \cdot r^2+0.3 \quad \text{Equation 7}$$

In Equation 7, r takes a value from 0 to 1 by being standardized at the outermost periphery.

To obtain a transmittance of the lens in its entirety, i.e., $t_{all}$, "opd(r)" in Equation 7 may be substituted into "d" in Equation 6, and integration may be performed in the full-radius region.

The transmittance of a ring zone whose width is a micro radius dr in the radius r is expressed by Equation 8.

$$2 \cdot \pi \cdot r \cdot dr \cdot t(opd(r)) \quad \text{Equation 8}$$

Therefore, Equation 9 is established.

$$t_{all} = \frac{1}{\pi} \int_0^1 2 \cdot \pi \cdot r \cdot t(opd(r)) \cdot dr \quad \text{Equation 9}$$
$$= 1.8 \cdot \exp[-0.21] \cdot \frac{1 - \exp[-0.7(h - 0.3)]}{1.4(h - 0.3)}$$

Figure 5B:
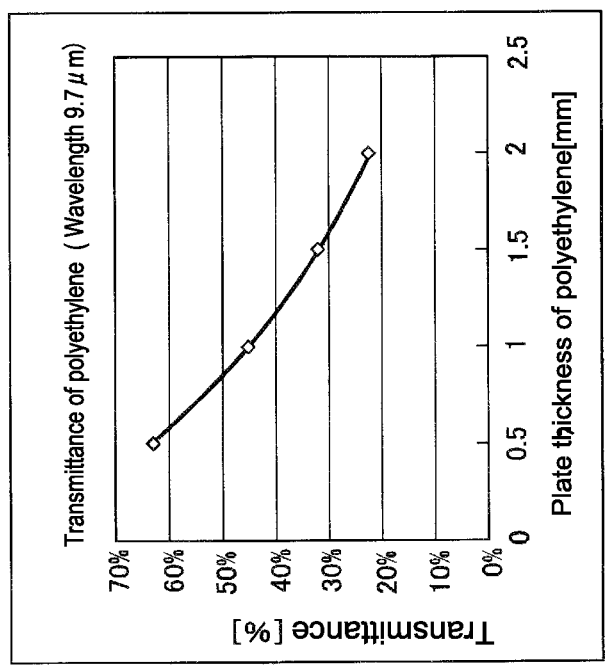
FIG. 5B is a diagram showing how the lens characteristically shows a change of transmittance in its entirety depending on the maximum ray length (h)

FIG. 5B shows the transmittance of the lens in its entirety in response to a change of h, i.e., the optical path length of the outermost peripheral light in the lens (that is, the maximum ray length described above).

When the maximum ray length is 2.0 mm, the transmittance of the lens in its entirety is 42.7%.

This value is equal to the value of the transmittance obtained by Equation 5 above, i.e., the value with which the signal output from the object is larger than the noise output from the lens.

This tells why the maximum ray length h is expected to be 2.0 mm or less.

Herein, in view of the transmittance, the maximum ray length h of the lens taking a small value is desirable. However, when the maximum ray length h takes a too small value, this causes difficulty in ensuring the strength of the lens, and also difficulty in ensuring the capability of aberration correction.

In this respect, the desirable maximum ray length h is at least 0.3 mm or more. That is, the maximum ray length h is desirably in a range from 0.3 mm to 2.0 mm inclusive.

For actually designing the infrared optical system, the following respects are to be also taken into consideration together with the respects described above That is, for increasing the range of use of a far infrared device in the future, the optical system is expected to have a wide angle of view, specifically, the angle of at least more than 25° is desirable. This is because, although devices making use of far infrared rays have been recently used as temperature or human detection sensors, such devices are set to be low in resolution, and are often not provided with an optical system that forms an image displaying even the shape of an imaging target, e.g., a thermoviewer or a night vision system.

In specific Examples that will be described later, the optical system is designed in consideration of this respect.

In another respect, the optical system is expected to have a small F number of 1.8 or smaller. This is because the far infrared rays are low in energy, and thus imaging elements in use with visible light are not good for use therewith. A small F number is also for gathering a larger amount of light.

If the optical system is for the application use with which a high resolution is expected for measurement of a temperature distribution, for example, the F number is desirably 1.3 or smaller for gathering a larger amount of light, and for improving the resolving power.

In the following Examples, the optical system is designed considering also such requests about the F number.

2. SPECIFIC EXAMPLES

2-1. Example 1

Figure 6:
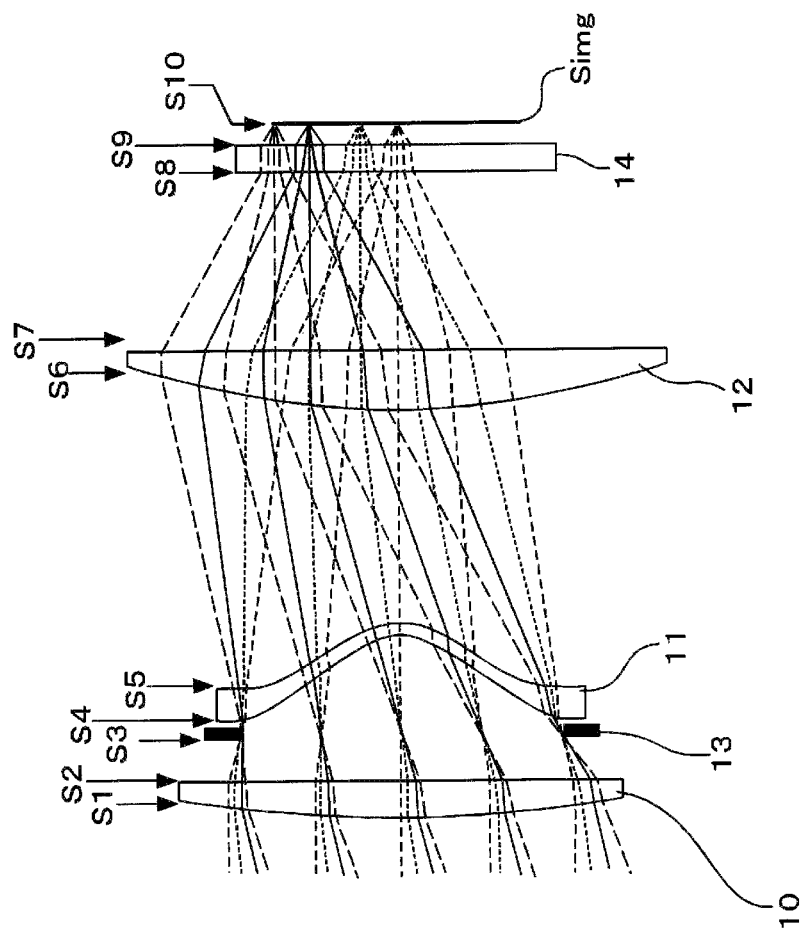
FIG. 6 is a diagram showing the configuration of an infrared optical system in Example 1.

FIG. 6 shows the configuration of the optical block 2 in Example 1.

In FIG. 6, the surface $S_{img}$ is the imaging surface of the image sensor 3 of FIG. 1 (and FIG. 2).

FIG. 6 also shows infrared rays.

In FIG. 6, the infrared rays indicated by short-dashed lines are those gathered at the image height of 0 mm, and the infrared rays indicated by dotted lines are those gathered at the image height of 1.5 mm.

Also in FIG. 6, the infrared rays indicated by solid lines are those gathered at the image height of 3.5 mm, and the infrared rays indicated by long-dashed lines are those gathered at the image height of 5.0 mm.

In this example, the first and third lenses 10 and 12 are each made of silicon, and the second lens 11 is made of high molecular weight polyethylene.

Herein, a cover glass 14 made of a flat member is provided immediately in front of the image sensor 3. This cover glass 14 is provided for protecting the imaging surface of the image sensor 3.

The cover glass 14 is also made of silicon (for allowing the passage of infrared rays therethrough).

In this example, the first lens 10 is a plano-convex lens whose surface on the object side is spherical, and the surface on the image-surface side is flat. This first lens 10 has the positive refractive power.

The second lens 11 is a meniscus lens whose surfaces are both aspherical, and which is convex to the image-surface side.

The third lens 12 is a plano-convex lens whose surface on the object side is spherical, and the surface on the image-surface side is flat. This third lens 12 has the positive refractive power.

Also in this example, the aperture stop 13 is disposed between the first and second lenses 10 and 11. That is, with the aperture stop 13 provided between any two of the first to third lenses 10 to 12 as such, an attempt is made to prevent the first or third lens 10 or 12 from increasing in effective diameter.

Also in this example, the shutter (not shown) is provided where the aperture stop 13 is formed. With the shutter provided where the aperture stop 13 is formed as such, an attempt is made to prevent any possible variation of amount of light in the configuration of using a pyroelectric element as an infrared detection element.

Moreover, with such a configuration that the aperture stop 13 is provided between the first and second lenses 10 and 11, and the shutter is provided where the aperture stop is formed, an attempt is made to prevent any possible degradation of the S/N that is caused by the heat absorbed in the resin-made second lens 11.

FIG. 7 shows coefficients of the lenses in Example 1, related to the shape of the lenses (and the aperture stop 13), and the lens spacing.

As to an aspherical lens, the shape of the lens surfaces, i.e., whether it is concave or convex, is expressed as below using the radius r.

$$Z(r) = \frac{r^2/R}{1 + \sqrt{1 - (1+k) \cdot r^2/R^2}} + A_4 r^4 + A_6 r^6 + A_8 r^8 + A_{10} r^{10} + \cdots \quad \text{Equation 10}$$

In Equation 10, "Z(r)" denotes the height of the lens surface at a point on the radius r about the optical axis. Herein, the height of the lens surface on the object side takes a negative value, and that on the image-surface side takes a positive value. Also in Equation 10, "R" is a radius of curvature, "k" is an eccentricity, and "A4", "A6", "A8", "A10", and others are each an aspherical coefficient.

In FIG. 7, a surface S0 denotes the object surface, which is positioned away by 9000 mm from the first lens 10 located closest to the object in this example.

Surfaces S1 and S2 respectively denote the surfaces of the first lens 10, i.e., the object-side surface and the image-surface-side surface. A surface S3 denotes the surface of the aperture stop 13, and surfaces S4 and S5 respectively denote the surfaces of the second lens 11, i.e., the object-side surface and the image-surface-side surface. Surfaces S6 and S7 respectively denote the surfaces of the third lens 12, i.e., the object-side surface and the image-surface-side surface. Surfaces S8 and S9 respectively denote the surfaces of the cover glass (CG) 14, i.e., the object-side surface and the image-surface-side surface. These surfaces S8 and S9 are each a flat surface.

The surface S10 is the surface $S_{img}$.

In Example 1, silicon used in the first and third lenses 10 and 12 has the refractive index of 3.4212, and polyethylene used in the second lens 11 has the refractive index of 1.54.

The aperture stop 13 has the diameter of 12.98 mm, and the focal length of 14.9 mm, thereby implementing the F number of 1.09, and the horizontal angle of view of 30.1°.

Figure 8:
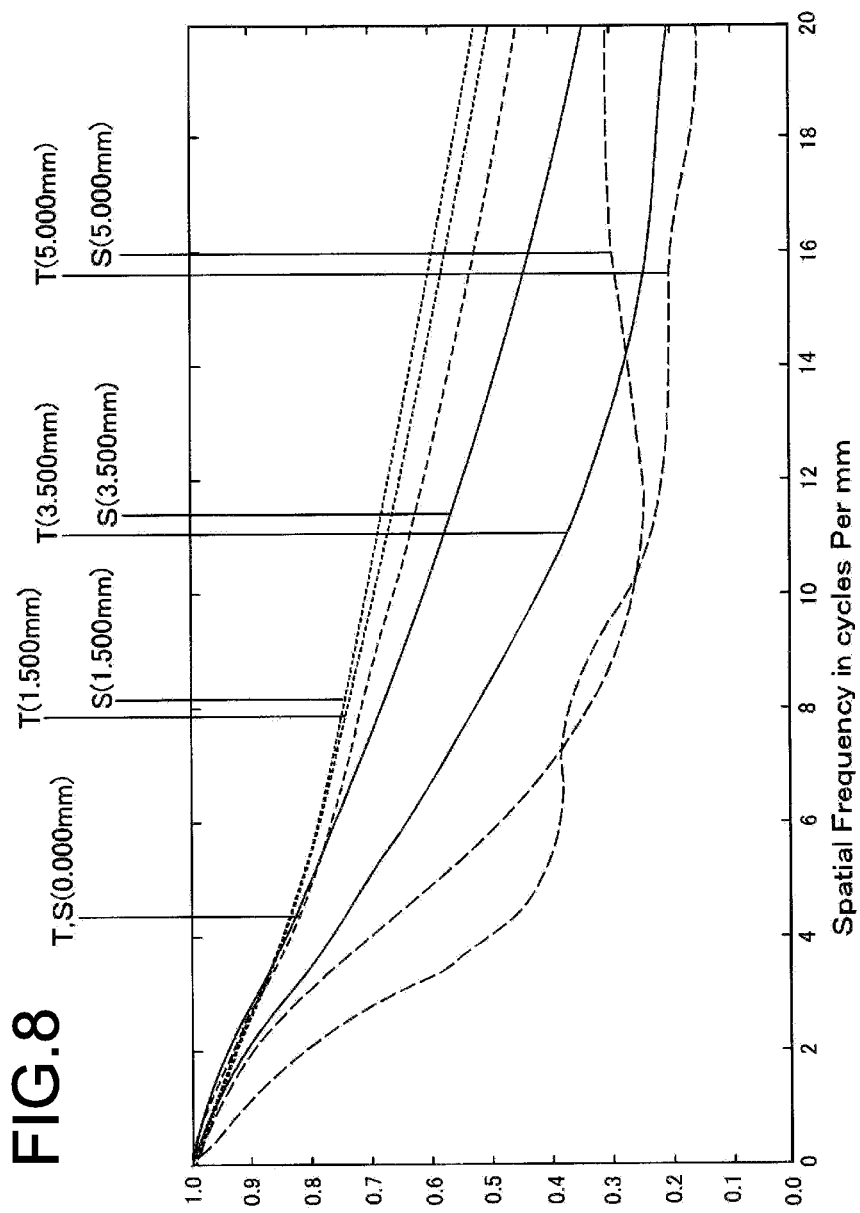
FIG. 8 is a diagram showing the property of resolving power (MTF; Modulation Transfer Function) at each image height (0 mm, 1.5 mm, 3.5 mm, and 5.0 mm) in the infrared optical system in Example 1.

FIG. 8 shows the property of resolving power (MTF) at each image height (0 mm, 1.5 mm, 3.5 mm, and 5.0 mm) in the optical block 2 in Example 1.

FIG. 8 specifically shows the property at each image height with the lateral axis indicating the spatial frequency (lines/mm), and the vertical axis indicating an OTF (Optical Transfer Function).

Also in FIG. 8, the short-dashed lines indicate infrared rays at the image height of 0 mm, the dotted lines indicate infrared rays at the image height of 1.5 mm, the solid lines indicate infrared rays at the image height of 3.5 mm, and the long-dashed lines indicate infrared rays at the image height of 5.0 mm. In the drawing, "T" denotes a tangential value, and "S" denotes a sagittal value.

Assumed here is that the image height of 5.0 mm is 100%, and in this case, it is desirable if the image height of 0 mm being 0% and the image height of 1.5 mm being 30% derive the MTF value (OTF value) of 0.3 or more at the spatial frequency of 20 lines/mm, and if the image height of 3.5 mm being 70% derives the MTF value of 0.3 or more at the spatial frequency of 10 lines/mm.

The infrared optical system in Example 1 shows a high resolving power, i.e., the MTF value is 0.457 at the spatial frequency of 20 lines/mm with the image height of 0 mm, the tangential MTF value is 0.496 and the sagittal MTF value is 0.544 at the spatial frequency of 20 lines/mm with the image height of 1.5 mm, and the tangential MTF value is 0.434 and the sagittal MTF value is 0.619 at the spatial frequency of 10 lines/mm with the image height of 3.5 mm.

With the optical system in Example 1 as such, the moderately-priced material of silicon is used to form the flat- or spherical-shaped first and third lenses 10 and 12 low in processing cost to put those in charge of the optical power, and the easy-to-process material of polyethylene is used to form the aspherical second lens 11 for aberration correction.

Although polyethylene is indeed low in transmittance compared to silicon, the optical system is controlled not to be reduced in transmittance with the limited use of a polyethylene lens, i.e., only a piece, and with the maximum ray length of the second lens 11 controlled to be 1.17 mm, i.e., 2.0 mm or less. Moreover, with the focal length being short as 14.9 mm, the optical system shows the sufficient level of resolving power in the wavelength range of 8 to 12 μm with less influence of chromatic aberration.

Furthermore, with the shutter provided where the aperture stop is formed, the amount of heat radiation from the second lens 11 to the image sensor 3 remains the same, and when the image sensor 3 uses a pyroelectric element that detects any change of incoming amount of heat, the amount of heat radiation from the second lens 11 is not detected. Polyethylene generally absorbs more infrared rays than silicon or others, and this means a large amount of heat radiation therefrom. However, with the configuration in Example 1, the S/N is effectively controlled not to be degraded in the optical system.

As such, Example 1 leads to the sufficient level of resolving power with control over cost not to increase, and with an attempt to realize a wide angle of view of about 30°.

2-2. Example 2

Figure 9:
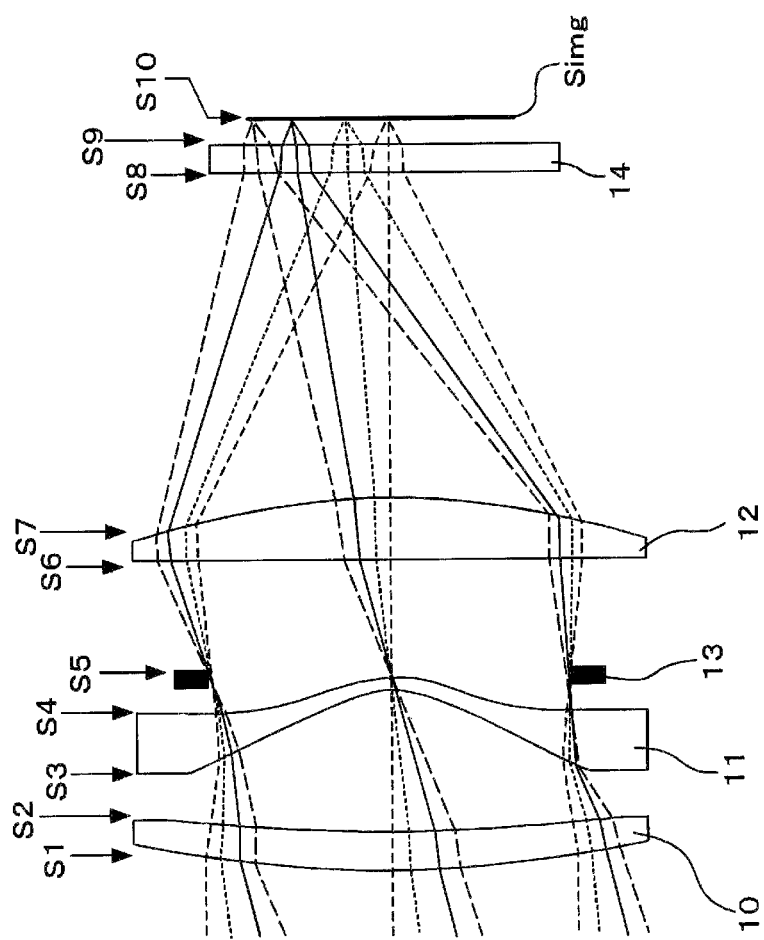
FIG. 9 is a diagram showing the configuration of an infrared optical system in Example 2.

FIG. 9 shows the configuration of the optical block 2 in Example 2.

FIG. 9 also shows infrared rays gathered at each image height (0 mm, 1.5 mm, 3.5 mm, and 5.0 mm). Also in FIG. 9, the short-dashed lines indicate infrared rays at the image height of 0 mm, the dotted lines indicate infrared rays at the image height of 1.5 mm, the solid lines indicate infrared rays at the image height of 3.5 mm, and the long-dashed lines indicate infrared rays at the image height of 5.0 mm.

In FIG. 9, the optical block 2 in Example 2 also includes the silicon-made first lens 10, the high molecular weight polyethylene-made second lens 11, the silicon-made third lens 12, and the silicon-made cover glass 14 in order from the object side.

Note that, in Example 2, the aperture stop 13 is disposed between the second and third lenses 11 and 12.

Also in this configuration, with the aperture stop 13 disposed between any two of the first to third lenses 10 to 12, an attempt is made to prevent the first or third lens 10 or 12 from increasing in effective diameter.

In this case, the first lens 10 is a meniscus lens whose surfaces are both spherical, and which is convex to the object side.

The third lens 12 is a meniscus lens whose surfaces are both spherical, and which is convex to the image-surface side.

The first and third lenses 10 and 12 are each with the positive refractive power.

Also in Example 2, the second lens 11 is a meniscus lens whose surfaces are both aspherical, and which is convex to the image-surface side.

In Example 2, the resin-made second lens 11 is so shaped that the flange, i.e., the peripheral portion, thereof has a flat portion on both sides of the object and the image surface. Thereafter, as shown in FIG. 9, the three lenses are formed to have the same outer diameter, and by using the flat portions of the flange as such, the three lenses are accommodated in the same lens barrel at predetermined spacing via a spacer.

As such, with the lenses having the same outer diameter and being all fit in the lens barrel using the spacer, the optical block 2 is easily assembled with control over an eccentricity of the lenses.

This is applied also to Examples 3 to 6 that will be described below.

Also in this example, the shutter (not shown) is provided where the aperture stop 13 is formed. With the shutter provided where the aperture stop 13 is formed as such, an attempt is made to prevent any possible variation of amount of light in the configuration of using a pyroelectric element as an infrared detection element.

FIG. 10 shows coefficients of the lenses in Example 2, related to the shape of the lenses (and the aperture stop 13), and the lens spacing.

Compared to Example 1, the surface numbers in Example 2 are defined differently therefrom as below.

That is, in Example 2, the surfaces S3 and S4 respectively denote the surfaces of the second lens 11, i.e., the object-side surface and the image-surface-side surface, and the surface S5 is the surface of the aperture stop 13.

Also in FIG. 10, the distance from the surface S0 being the object surface to the surface S1 is 9000 mm.

Also in this case, silicon used in the first and third lenses 10 and 12 has the refractive index similar to that in Example 1, and polyethylene used in the second lens 11 has the refractive index similar to that in Example 1. The focal length herein is also similar to that in Example 1.

In this example, the aperture stop 13 has the diameter of 13.24 mm, and the F number of 1.11. The horizontal angle of view is also 30.1° similarly to that in Example 1.

Figure 11:
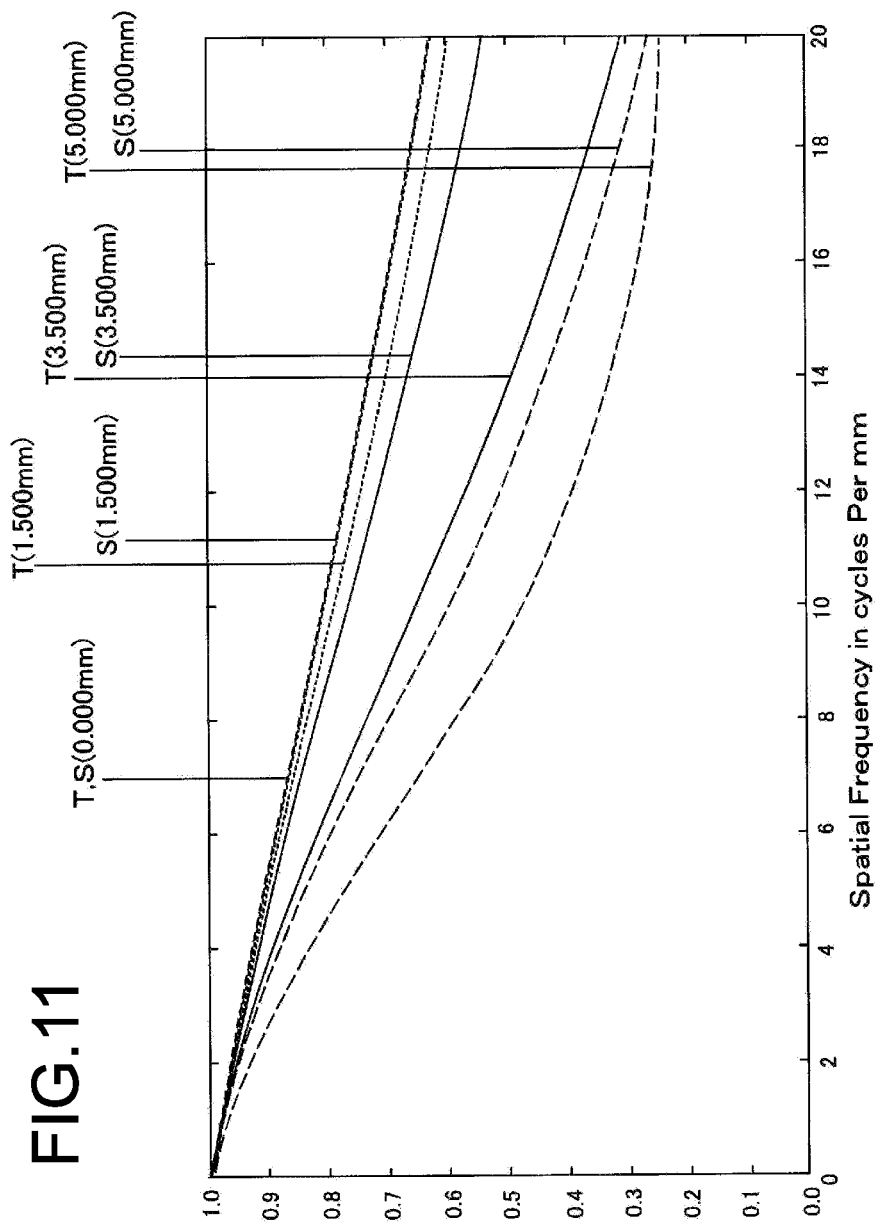
FIG. 11 is a diagram showing the property of resolving power (MTF) at each image height (0 mm, 1.5 mm, 3.5 mm, and 5.0 mm) in the infrared optical system in Example 2.

FIG. 11 shows the property of resolving power (MTF) at each image height (0 mm, 1.5 mm, 3.5 mm, and 5.0 mm) in the optical block 2 in Example 2.

Also in FIG. 11, the lateral axis indicates the spatial frequency (lines/mm), and the vertical axis indicates the OTF.

The optical system in Example 2 shows a high resolving power, i.e., the MTF value is 0.631 at the spatial frequency of 20 lines/mm with the image height of 0 mm, the tangential MTF value is 0.609 and the sagittal MTF value is 0.637 at the spatial frequency of 20 lines/mm with the image height of 1.5 mm, and the tangential MTF value is 0.667 and the sagittal MTF value is 0.776 at the spatial frequency of 10 lines/mm with the image height of 3.5 mm.

Also with the optical system in Example 2 as such, the moderately-priced material of silicon is used to form the flat- or spherical-shaped first and third lenses 10 and 12 low in processing cost to put those in charge of the optical power, and the easy-to-process material of polyethylene is used to form the aspherical second lens 11 for aberration correction.

Also in this case, with the limited use of a polyethylene lens, i.e., only a piece, and with the maximum ray length of the second lens 11 controlled to be 1.96 mm, the optical system is controlled not to be reduced in transmittance. Moreover, with the focal length being short as 14.9 mm, the optical system shows the sufficient level of resolving power in the wavelength range of 8 to 12 μm with less influence of chromatic aberration.

In Example 2, the first and third lenses 10 and 12 are each a meniscus lens, which are each formed by grinding flat-shaped silicon to be concave on one side, i.e., the side facing the second lens 11. The peripheral portion on the concave surface side thus remains flat. With the first lens 10 whose convex surface is on the object side, and with the third lens 12 whose convex surface is on the image-surface side, their flat portions on the concave surface sides are faced to each other. This is considered more suitable for adjustment of the lens spacing using the spacer described above.

As such, the configuration in Example 2 also leads to the sufficient level of resolving power with control over cost not to increase, and with an attempt to realize a wide angle of view of about 30°.

2-3. Example 3

Figure 12:
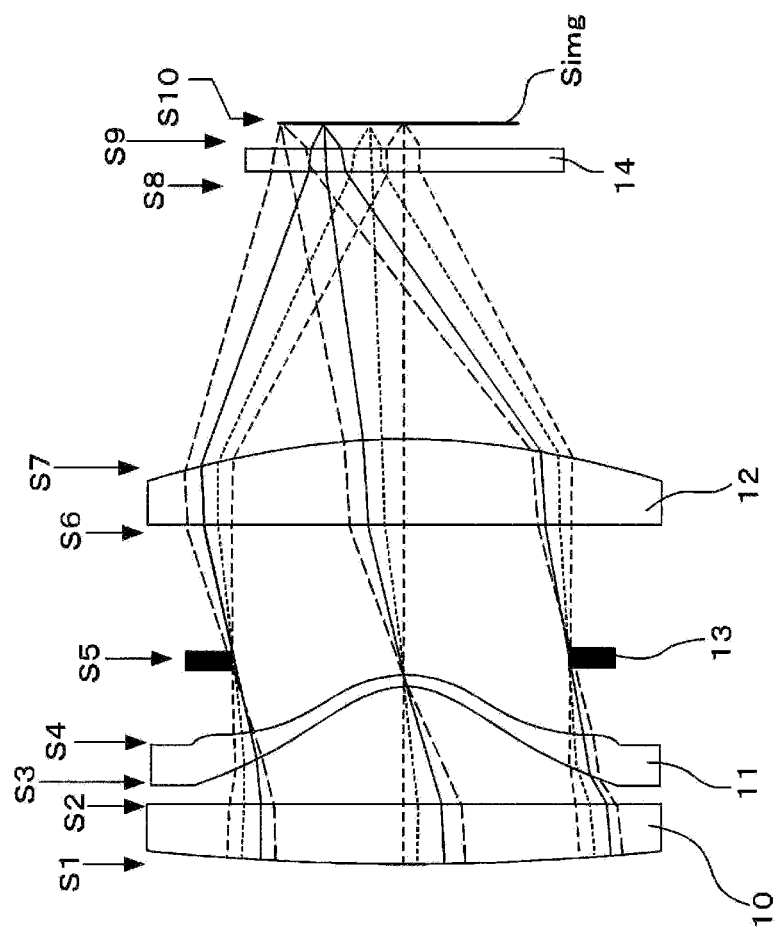
FIG. 12 is a diagram showing the configuration of an infrared optical system in Example 3.

FIG. 12 shows the configuration of the optical block 2 in Example 3.

FIG. 12 also shows infrared rays gathered at each image height (0 mm, 1.5 mm, 3.5 mm, and 5.0 mm). Also in FIG. 12, the short-dashed lines indicate infrared rays at the image height of 0 mm, the dotted lines indicate infrared rays at the image height of 1.5 mm, the solid lines indicate infrared rays at the image height of 3.5 mm, and the long-dashed lines indicate infrared rays at the image height of 5.0 mm.

Herein, the arrangement of the components, i.e., the lenses, the aperture stop 13, and the cover glass 14, is similar to that in Example 2. The materials used for the lenses are also similar to those in Example 2.

In Example 3, the first and third lenses 10 and 12 are each with the positive refractive power. The first lens 10 is a plano-convex lens whose surface on the object side is spherical, and the surface on the image-surface side is flat. The third lens 12 is a plano-convex lens whose surface on the object side is flat, and the surface on the image-surface side is spherical.

Similarly to Example 2 above, the second lens 11 is a meniscus lens whose surfaces are both aspherical, and which is convex to the image-surface side. The flange of the second lens 11 has a flat portion on both sides of the object and the image surface.

Also in this configuration, similarly to Example 2, with the aperture stop 13 disposed between any two of the first to third lenses 10 to 12, an attempt is made to prevent the first or third lens 10 or 12 from increasing in effective diameter.

Also in this example, the shutter (not shown) is provided where the aperture stop 13 is formed. With the shutter provided where the aperture stop 13 is formed as such, an attempt is made to prevent any possible variation of amount of light in the configuration of using a pyroelectric element as an infrared detection element.

FIG. 13 shows coefficients of the lenses in Example 3, related to the shape of the lenses (and the aperture stop 13), and the lens spacing.

The surface numbers in Example 3 are defined similarly to those in Example 2.

Also in this example, the object surface being the surface S0 is positioned away by 9000 mm from the first lens 10.

Herein, the values are similar to those in Examples 1 and 2, i.e., the refractive index of silicon used in the first and third lenses 10 and 12, the refractive index of polyethylene used in the second lens 11, and the focal length.

In this example, the aperture stop 13 has the diameter of 13.75 mm, and the F number of 1.06. The horizontal angle of view is also 30.1° similarly to Examples 1 and 2.

Figure 14:
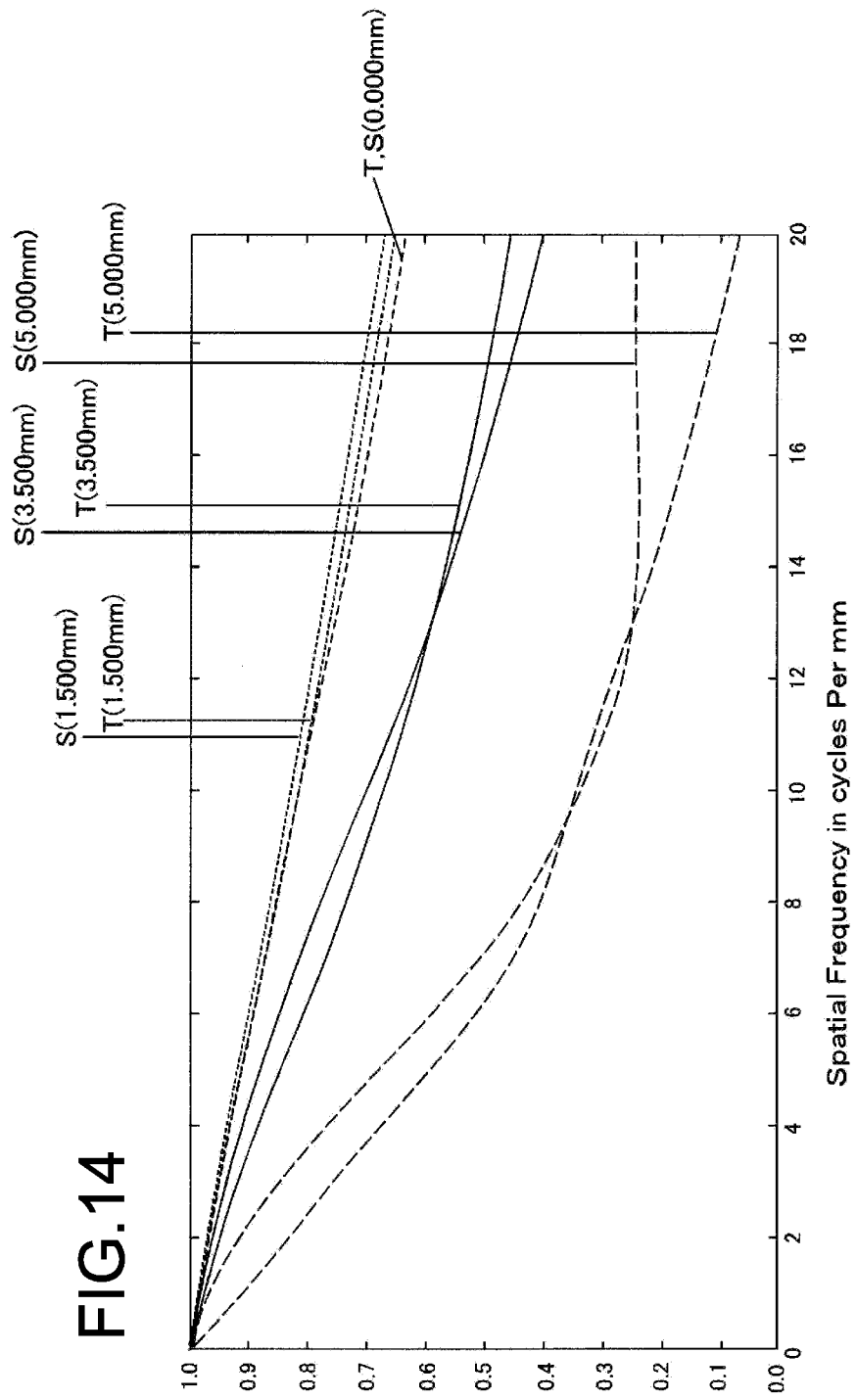
FIG. 14 is a diagram showing the property of resolving power (MTF) at each image height (0 mm, 1.5 mm, 3.5 mm, and 5.0 mm) in the infrared optical system in Example 3.

FIG. 14 shows the property of resolving power (MTF) at each image height (0 mm, 1.5 mm, 3.5 mm, and 5.0 mm) in the optical block 2 in Example 3.

Also in FIG. 14, the lateral axis indicates the spatial frequency (lines/mm), and the vertical axis indicates the OTF.

The optical system in Example 3 shows a high resolving power, i.e., the MTF value is 0.640 at the spatial frequency of 20 lines/mm with the image height of 0 mm, the tangential MTF value is 0.661 and the sagittal MTF value is 0.679 at the spatial frequency of 20 lines/mm with the image height of 1.5 mm, and the tangential MTF value is 0.676 and the sagittal MTF value is 0.700 at the spatial frequency of 10 lines/mm with the image height of 3.5 mm.

Also with the optical system in Example 3 as such, the moderately-priced material of silicon is used to form the flat- or spherical-shaped first and third lenses 10 and 12 low in processing cost to put those in charge of the optical power, and the easy-to-process material of polyethylene is used to form the aspherical second lens 11 for aberration correction.

Also in this case, with the limited use of a polyethylene lens, i.e., only a piece, and with the maximum ray length of the second lens 11 controlled to be 1.68 mm, the optical system is controlled not to be reduced in transmittance.

Moreover, with the focal length being short as 14.9 mm, the optical system shows the sufficient level of resolving power in the wavelength range of 8 to 12 μm with less influence of chromatic aberration.

As such, Example 3 also leads to the sufficient level of resolving power with control over cost not to increase, and with an attempt to realize a wide angle of view of about 30°.

2-4. Example 4

Figure 15:
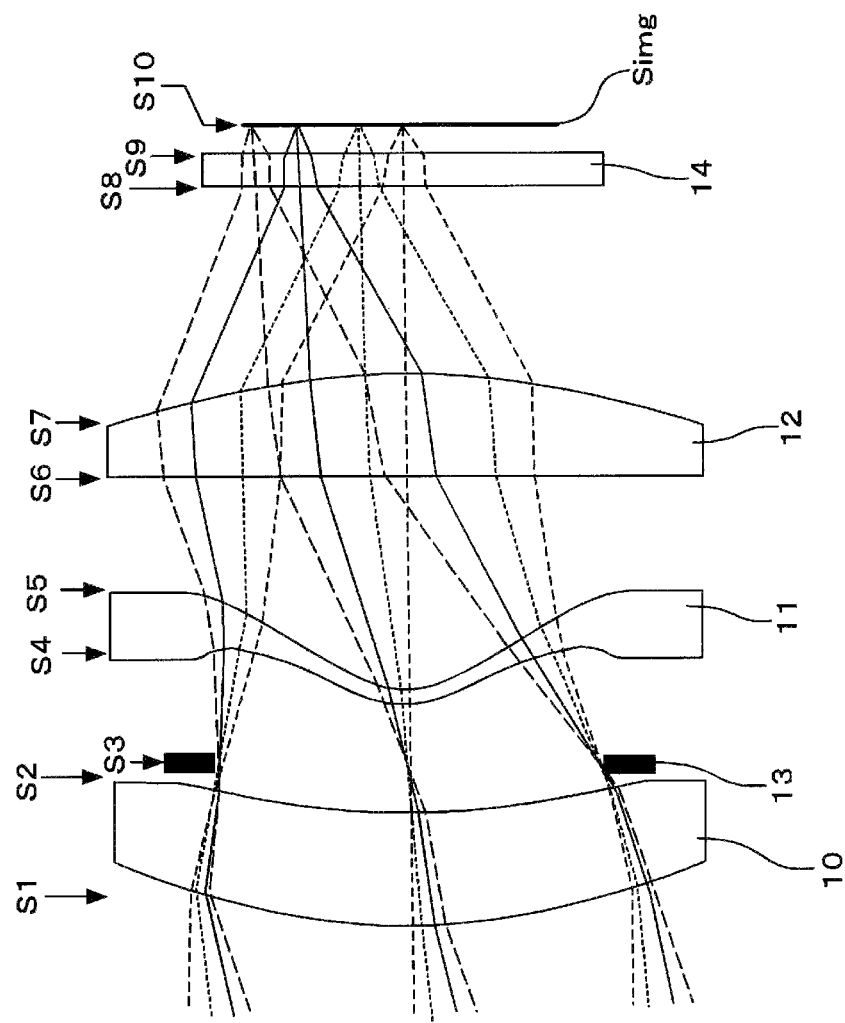
FIG. 15 is a diagram showing the configuration of an infrared optical system in Example 4.

FIG. 15 shows the configuration of the optical block 2 in Example 4.

FIG. 15 also shows infrared rays gathered at each image height (0 mm, 1.5 mm, 3.5 mm, and 5.0 mm). Also in FIG. 15, the short-dashed lines indicate infrared rays at the image height of 0 mm, the dotted lines indicate infrared rays at the image height of 1.5 mm, the solid lines indicate infrared rays at the image height of 3.5 mm, and the long-dashed lines indicate infrared rays at the image height of 5.0 mm.

Herein, the arrangement of the components, i.e., the lenses, the aperture stop 13, and the cover glass 14, is similar to that in Example 1. The materials used for the lenses are also similar to those in Example 1.

In Example 4, the first and third lenses 10 and 12 are each with the positive refractive power. The first lens 10 is a meniscus lens whose surfaces are both spherical, and which is convex to the object side. The third lens 12 is a meniscus lens whose surfaces are both spherical, and which is convex to the image-surface side.

Similarly to Example 2 above, the second lens 11 is a meniscus lens whose surfaces are both aspherical, and which is, in this example, convex to the object side. Also in this example, the second lens 11 is so processed that the flange has a flat portion on both sides of the object and the image surface similarly to that in Example 2.

Also in this example, similarly to Example 1, with the aperture stop 13 disposed between any two of the first to third lenses 10 to 12, an attempt is made to prevent the first or third lens 10 or 12 from increasing in effective diameter.

Also in this example, the shutter (not shown) is provided where the aperture stop 13 is formed. With the shutter provided where the aperture stop 13 is formed as such, an attempt is made to prevent any possible variation of amount of light in the configuration of using a pyroelectric element as an infrared detection element.

With such a configuration that the aperture stop 13 is provided between the first and second lenses 10 and 11, and the shutter is provided where the aperture stop is formed, an attempt is made to prevent any possible degradation of the S/N that is caused by the heat absorbed in the resin-made second lens 11.

FIG. 16 shows coefficients of the lenses in Example 4, related to the shape of the lenses (and the aperture stop 13), and the lens spacing.

The surface numbers in Example 4 are defined similarly to those in Example 1.

Also in this example, the object surface being the surface S0 is positioned away by 9000 mm from the first lens 10 similarly to Example 1.

Herein, the values are similar to those in Example 1, i.e., the refractive index of silicon used in the first and third lenses 10 and 12, the refractive index of polyethylene used in the second lens 11, and the focal length.

In this example, the aperture stop 13 has the diameter of 12.24 mm, and the F number of 1.06. The horizontal angle of view is also 30.1° similarly to the value in Examples 1 and 2.

Figure 17:
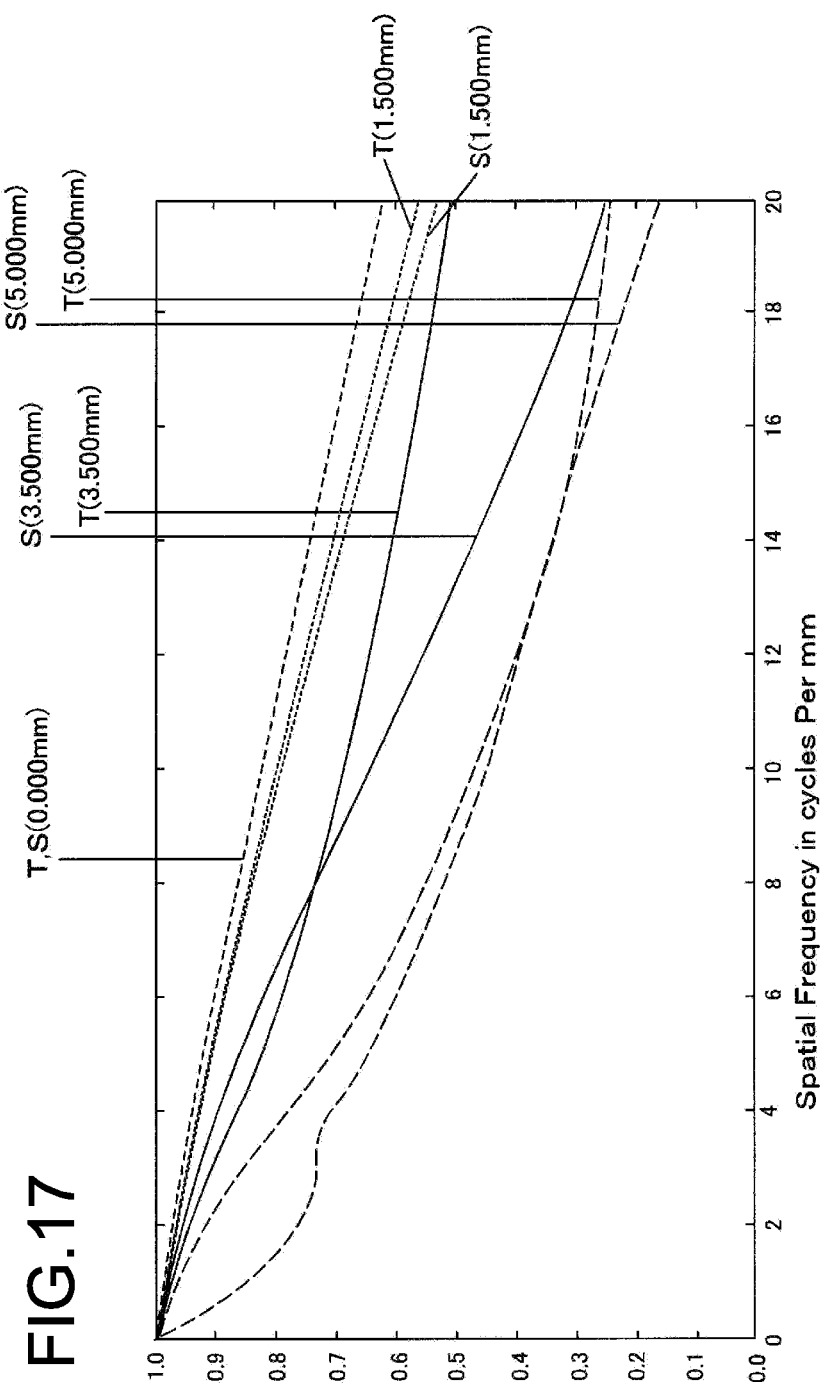
FIG. 17 is a diagram showing the property of resolving power (MTF) at each image height (0 mm, 1.5 mm, 3.5 mm, and 5.0 mm) in the infrared optical system in Example 4.

FIG. 17 shows the property of resolving power (MTF) at each image height (0 mm, 1.5 mm, 3.5 mm, and 5.0 mm) in the optical block 2 in Example 4.

Also in FIG. 17, the lateral axis indicates the spatial frequency (lines/mm), and the vertical axis indicates the OTF.

The optical system in Example 4 shows a high resolving power, i.e., the MTF value is 0.621 at the spatial frequency of 20 lines/mm with the image height of 0 mm, the tangential MTF value is 0.566 and the sagittal MTF value is 0.534 at the spatial frequency of 20 lines/mm with the image height of 1.5 mm, and the tangential MTF value is 0.677 and the sagittal MTF value is 0.654 at the spatial frequency of 10 lines/mm with the image height of 3.5 mm.

Also with the optical system in Example 4 as such, the moderately-priced material of silicon is used to form the flat- or spherical-shaped first and third lenses 10 and 12 low in processing cost to put those in charge of the optical power, and the easy-to-process material of polyethylene is used to form the aspherical second lens 11 for aberration correction.

Also in this case, with the limited use of a polyethylene lens, i.e., only a piece, and with the maximum ray length of the second lens 11 controlled to be 1.70 mm, the optical system is controlled not to be reduced in transmittance.

Moreover, with the focal length being short as 14.9 mm, the optical system shows the sufficient level of resolving power in the wavelength range of 8 to 12 μm with less influence of chromatic aberration.

In Example 4, similarly to Example 2 above, the first and third lenses 10 and 12 are each a meniscus lens, which are each formed by grinding flat-shaped silicon to be concave on one side, i.e., the side facing the second lens 11. The peripheral portion on the concave surface side thus remains flat. With the first lens 10 whose convex surface is on the object side, and with the third lens 12 whose convex surface is on the image-surface side, their flat portions on the concave surface sides are faced to each other. This is considered more suitable for adjustment of the lens spacing using the spacer described above.

As such, Example 4 also leads to the sufficient level of resolving power with control over cost not to increase, and with an attempt to realize a wide angle of view of about 30°.

2-5. Example 5

Figure 18:
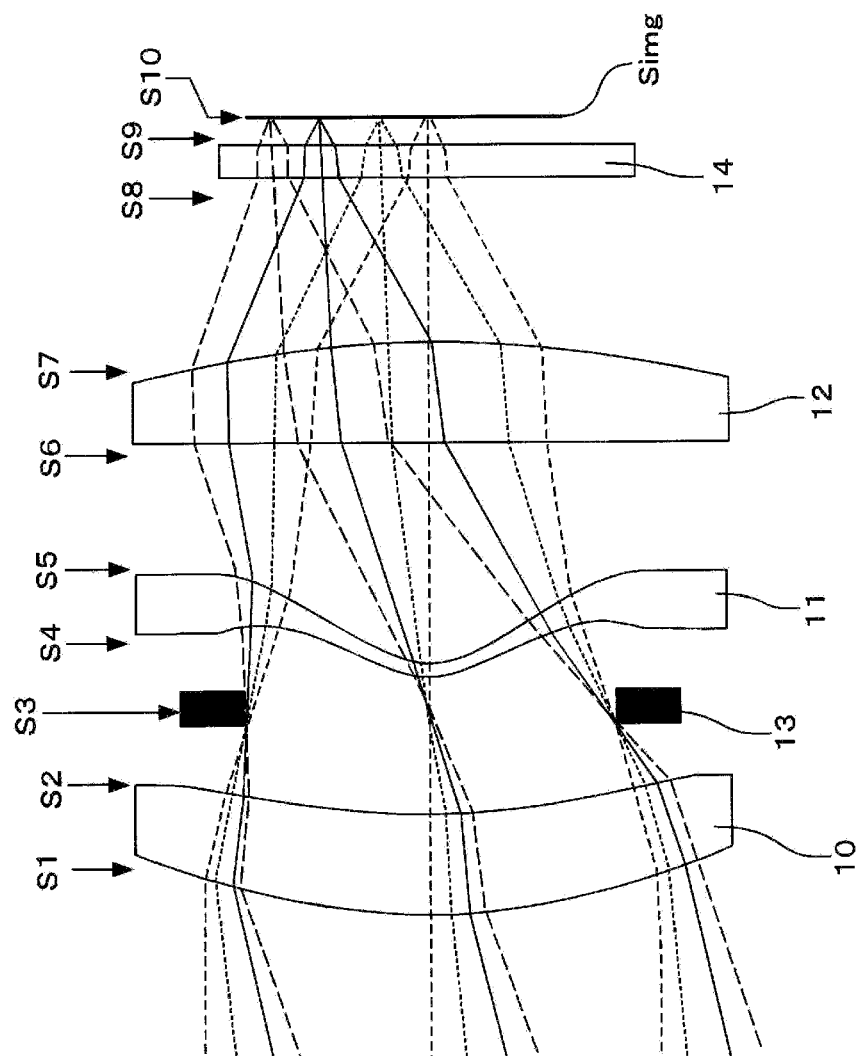
FIG. 18 is a diagram showing the configuration of an infrared optical system in Example 5.

FIG. 18 shows the configuration of the optical block 2 in Example 5.

FIG. 18 also shows infrared rays gathered at each image height (0 mm, 1.5 mm, 3.5 mm, and 5.0 mm). Also in FIG. 18, the short-dashed lines indicate infrared rays at the image height of 0 mm, the dotted lines indicate infrared rays at the image height of 1.5 mm, the solid lines indicate infrared rays at the image height of 3.5 mm, and the long-dashed lines indicate infrared rays at the image height of 5.0 mm.

Herein, the arrangement of the components, i.e., the lenses, the aperture stop 13, and the cover glass 14, is similar to that in Example 1.

In Example 5, the first and third lenses 10 and 12 are each made of germanium (Ge).

The second lens 11 in this example is also made of high molecular weight polyethylene. The cover glass 14 herein is also made of silicon similarly to that in the other Examples above.

In Example 5, the first and third lenses 10 and 12 are each with the positive refractive power. The first lens 10 is a meniscus lens whose surface on the object side is convex. The third lens 12 is a plano-convex lens whose surface on the object side is flat, and the surface on the image-surface side is spherical.

The second lens 11 is a meniscus lens whose surfaces are both aspherical, and which is convex to the object side. Also in this example, the second lens 11 is so processed that the flange thereof has a flat portion on both sides of the object and the image surface similarly to that in Example 2 above.

Also in this example, similarly to the other Examples above, with the aperture stop 13 disposed between any two of the first to third lenses 10 to 12, an attempt is made to prevent the first or third lens 10 or 12 from increasing in effective diameter.

Also in this example, the shutter (not shown) is provided where the aperture stop 13 is formed. With the shutter provided where the aperture stop 13 is formed as such, an attempt is made to prevent any possible variation of amount of light in the configuration of using a pyroelectric element as an infrared detection element.

With such a configuration that the aperture stop 13 is provided between the first and second lenses 10 and 11, and the shutter is provided where the aperture stop is formed, an attempt is made to prevent any possible degradation of the S/N that is caused by the heat absorbed in the resin-made second lens 11.

FIG. 19 shows coefficients of the lenses in Example 5, related to the shape of the lenses (and the aperture stop 13), and the lens spacing.

The surface numbers in Example 5 are defined similarly to those in Example 1.

Also in this example, the object surface being the surface S0 is positioned away by 80000 mm from the first lens 10.

In Example 5, the refractive index of germanium used in the first and third lenses 10 and 12 is 4.0.

Herein, the other values are similar to those in the other Examples above, i.e., the refractive index of polyethylene used in the second lens 11, and the focal length.

In this example, the aperture stop 13 has the diameter of 11.58 mm, and the F number of 1.06. The horizontal angle of view is also 30.1° similarly to the other Examples above.

Figure 20:
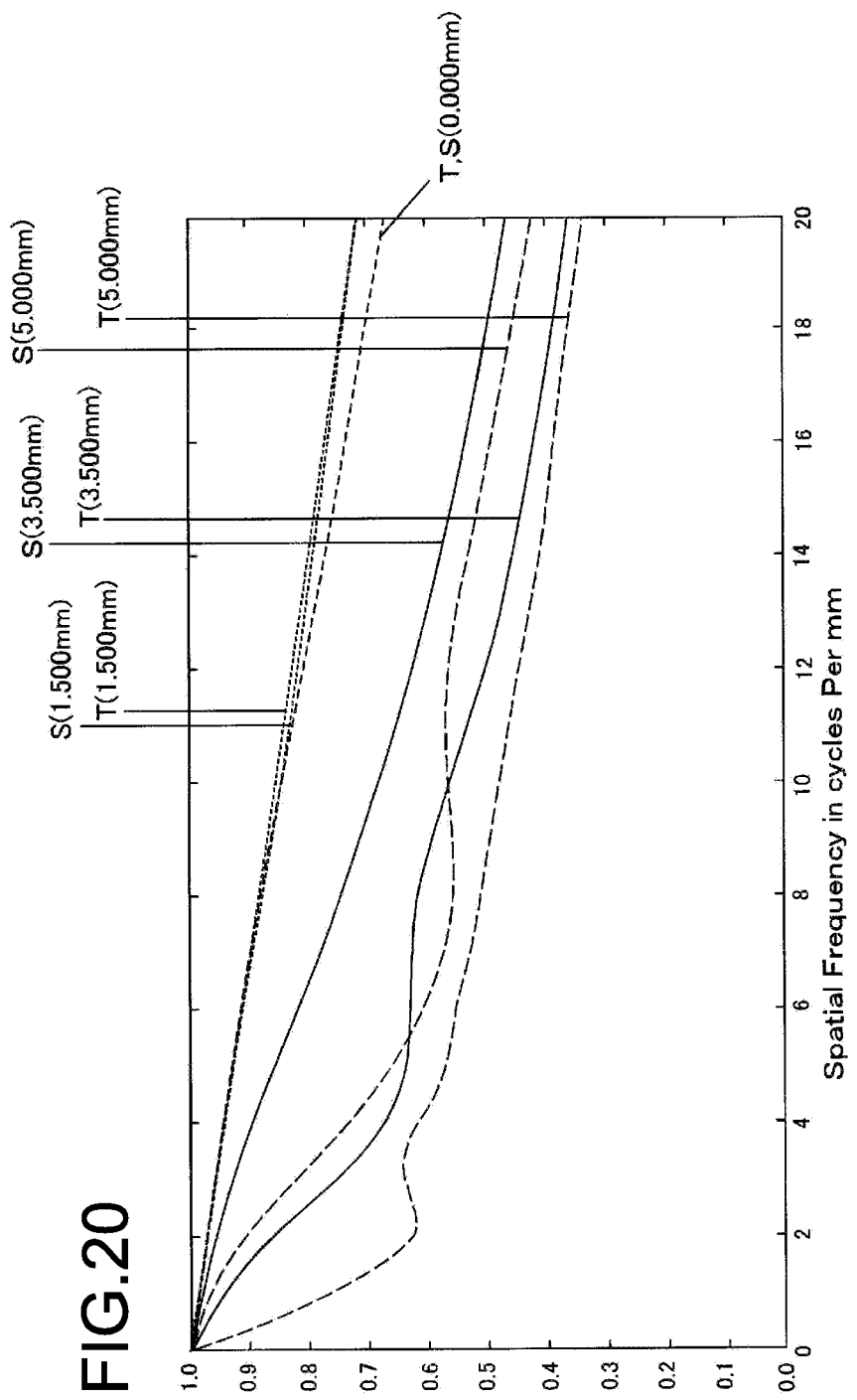
FIG. 20 is a diagram showing the property of resolving power (MTF) at each image height (0 mm, 1.5 mm, 3.5 mm, and 5.0 mm) in the infrared optical system in Example 5.

FIG. 20 shows the property of resolving power (MTF) at each image height (0 mm, 1.5 mm, 3.5 mm, and 5.0 mm) in the optical block 2 in Example 5.

Also in FIG. 20, the lateral axis indicates the spatial frequency (lines/mm), and the vertical axis indicates the OTF.

The optical system in Example 5 shows a high resolving power, i.e., the MTF value is 0.656 at the spatial frequency of 20 lines/mm with the image height of 0 mm, the tangential MTF value is 0.713 and the sagittal MTF value is 0.704 at the spatial frequency of 20 lines/mm with the image height of 1.5 mm, and the tangential MTF value is 0.592 and the sagittal MTF value is 0.701 at the spatial frequency of 10 lines/mm with the image height of 3.5 mm.

Also with the optical system in Example 5 as such, the first and third lenses 10 and 12 are formed to be flat or spherical in shape to be low in processing cost, thereby putting those in charge of the optical power. The easy-to-process material of polyethylene is used to form the aspherical second lens 11 for aberration correction.

Also in this case, with the limited use of a polyethylene lens, i.e., only a piece, and with the maximum ray length of the second lens 11 controlled to be 1.48 mm, the optical system is controlled not to be reduced in transmittance.

Moreover, with the focal length being short as 14.9 mm, the optical system shows the sufficient level of resolving power in the wavelength range of 8 to 12 μm with less influence of chromatic aberration.

In Example 5, similarly to Example 2 above, the first lens 10 is a meniscus lens, which is formed by grinding a flat-shaped base material (germanium in this case) to be concave on one side, i.e., the side facing the second lens 11. The peripheral portion on the concave surface side thus remains flat. This is considered more suitable for adjustment of the lens spacing using the spacer described above.

As such, Example 5 also leads to the sufficient level of resolving power with control over cost not to increase, and with an attempt to realize a wide angle of view of about 30°.

2-6. Example 6

Figure 21:
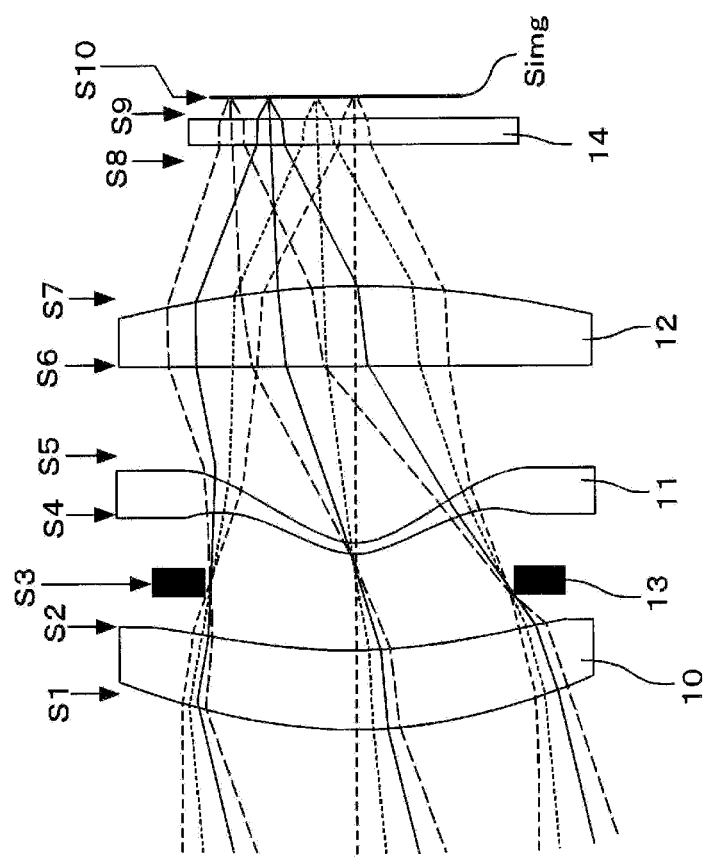
FIG. 21 is a diagram showing the configuration of an infrared optical system in Example 6.

FIG. 21 shows the configuration of the optical block 2 in Example 6.

FIG. 21 also shows infrared rays gathered at each image height (0 mm, 1.5 mm, 3.5 mm, and 5.0 mm). Also in FIG. 21, the short-dashed lines indicate infrared rays at the image height of 0 mm, the dotted lines indicate infrared rays at the image height of 1.5 mm, the solid lines indicate infrared rays at the image height of 3.5 mm, and the long-dashed lines indicate infrared rays at the image height of 5.0 mm.

Herein, the arrangement of the components, i.e., the lenses, the aperture stop 13, and the cover glass 14, is similar to that in Example 1. The materials used for the lenses are also similar to those in Example 1 above.

In Example 6, the first and third lenses 10 and 12 are each with the positive refractive power. The first lens 10 is a meniscus lens whose surfaces are both aspherical, and which is convex to the object side. The third lens 12 is a plano-convex lens whose surface on the object side is flat, and the surface on the image-surface side is spherical.

The second lens 11 is a meniscus lens whose surfaces are both aspherical, and which is convex to the object side. Also in this example, the second lens 11 is so processed that the flange thereof has a flat portion on both sides of the object and the image surface similarly to that in Example 2 above.

Also in this example, similarly to the other Examples above, with the aperture stop 13 disposed between any two of the first to third lenses 10 to 12, an attempt is made to prevent the first or third lens 10 or 12 from increasing in effective diameter.

Also in this example, the shutter (not shown) is provided where the aperture stop 13 is formed. With the shutter provided where the aperture stop 13 is formed as such, an attempt is made to prevent any possible variation of amount of light in the configuration of using a pyroelectric element as an infrared detection element.

With such a configuration that the aperture stop 13 is provided between the first and second lenses 10 and 11, and the shutter is provided where the aperture stop is formed, an attempt is made to prevent any possible degradation of the S/N that is caused by the heat absorbed in the resin-made second lens 11.

FIG. 22 shows coefficients of the lenses in Example 6, related to the shape of the lenses (and the aperture stop 13), and the lens spacing.

The surface numbers in Example 6 are defined similarly to those in Example 1.

In this example, the object surface being the surface S0 is positioned away by 80000 mm from the first lens 10.

Herein, the values are similar to those in Example 1, i.e., the refractive index of silicon used in the first and third lenses 10 and 12, the refractive index of polyethylene used in the second lens 11, and the focal length.

In this example, the aperture stop 13 has the diameter of 11.98 mm, and the F number of 1.06. The horizontal angle of view is also 30.1° similarly to other Examples above.

FIG. 23 shows the property of resolving power (MTF) at each image height (0 mm, 1.5 mm, 3.5 mm, and 5.0 mm) in the optical block 2 in Example 6.

Also in FIG. 23, the lateral axis indicates the spatial frequency (lines/mm), and the vertical axis indicates the OTF.

The optical system in Example 6 shows a high resolving power, i.e., the MTF value is 0.684 at the spatial frequency of 20 lines/mm with the image height of 0 mm, the tangential MTF value is 0.710 and the sagittal MTF value is 0.713 at the spatial frequency of 20 lines/mm with the image height of 1.5 mm, and the tangential MTF value is 0.631 and the sagittal MTF value is 0.615 at the spatial frequency of 10 lines/mm with the image height of 3.5 mm.

Also with the optical system in Example 6 as such, similarly to Example 1 above, the moderately-priced material of silicon is used to form the flat- or spherical-shaped first and third lenses 10 and 12 low in processing cost to put those in charge of the optical power, and the easy-to-process material of polyethylene is used to form the aspherical second lens 11 for aberration correction.

Also in this case, with the limited use of a polyethylene lens, i.e., only a piece, and with the maximum ray length of the second lens 11 controlled to be 1.55 mm, the optical system is controlled not to be reduced in transmittance.

Moreover, with the focal length being short as 14.9 mm, the optical system shows the sufficient level of resolving power in the wavelength range of 8 to 12 μm with less influence of chromatic aberration.

Also in Example 6, similarly to Example 5 above, the first lens 10 is a meniscus lens, which is formed by grinding a flat-shaped silicon to be concave on one side. The peripheral portion on the concave surface side thus remains flat. This is considered more suitable for adjustment of the lens spacing using the spacer described above.

As such, Example 6 also leads to the sufficient level of resolving power with control over cost not to increase, and with an attempt to realize a wide angle of view of about 30°.

3. Modification Examples

While the infrared optical system and the infrared imaging apparatus according to the embodiment of the present application have been described, the foregoing description is in all aspects illustrative and not restrictive.

That is, in Examples above, the resin material for use in the second lens 11 is exemplified by polyethylene. This is surely not the only option, and any other resin material is also applicable as long as the material has the improved transmittance in the far-infrared radiation area.

To be specific, the resin material for use as the second lens 11 may have the property of a relatively high transmittance, e.g., a transmittance of 20% or higher with the thickness of 2.0 mm (wavelength range from 8 μm to 12 μm).

Further, exemplified above is the case of using an inorganic material for forming the first and third lenses 10 and 12. Alternatively, the first and third lenses 10 and 12 may be made of different materials.

Still further, exemplified above is the case of providing the shutter to the optical system to be ready for the use of the image sensor 3 including a pyroelectric element as an infrared detection element. Needless to say, such a shutter is not necessarily provided when an element in use is of a bolometer type that outputs a value corresponding to the temperature itself.

The present application is also in the following structures.

(1) An infrared optical system, including:
three lenses of a first lens, a second lens, and a third lens that are provided from an object side to an image-surface side, the first and third lenses being each configured as a spherical lens made of an inorganic material and having a positive refractive power, the second lens being configured as a meniscus lens made of a resin material and having aspherical surfaces; and
an aperture stop that is provided between any two of the first to third lenses.

(2) The infrared optical system according to (1), in which
the second lens is set to have a maximum ray length of a light ray of 2.0 mm or less, the light ray passing through the second lens for image formation.

(3) The infrared optical system according to (1) or (2), in which
the second lens is made of polyethylene.

(4) The infrared optical system according to (1) to (3), further including
a shutter that is provided at a position of the aperture stop.

(5) The infrared optical system according to (1) to (4), in which
the aperture stop is provided between the first and second lenses, the infrared optical system further including
a shutter that is provided at a position of the aperture stop.

(6) The infrared optical system according to (1) to (5), in which
the first and third lenses are each one of a plano-convex lens and a meniscus lens.

(7) The infrared optical system according to (1) to (6), in which
the first and third lenses are each a plano-convex lens, the first lens has a convex surface that faces the object side, and
the third lens has a convex surface that faces the image-surface side.

(8) The infrared optical system according to (1) to (7), in which
the first and third lenses are each made of silicon.

(9) An infrared imaging apparatus, including:
the infrared optical system according to any of (1) to (8);
an infrared detection section configured to detect infrared light gathered by the infrared optical system; and
an image signal obtaining section configured to obtain an infrared image signal based on an infrared detection signal obtained by the infrared detection section.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An infrared optical system, comprising:
a first lens, a second lens, and a third lens that are provided from an object side to an image-surface side, the first and third lenses being each configured as a spherical lens including an inorganic material and having a positive refractive power, the second lens being configured as a meniscus lens including a resin material and having aspherical surfaces; and an aperture stop that is provided between any two of the first to third lenses, wherein the second lens is set to have a maximum ray length of a light ray of 2.0 mm or less, the light ray passing through the second lens for image formation.

2. The infrared optical system according to claim 1, wherein the second lens includes polyethylene.

3. The infrared optical system according to claim 1, further comprising a shutter positioned at the aperture stop.

4. The infrared optical system according to claim 1, wherein the aperture stop is provided between the first and second lenses, the infrared optical system further comprising a shutter positioned at the aperture stop.

5. The infrared optical system according to claim 1, wherein the first and third lenses are each one of a plano-convex lens and a meniscus lens.

6. The infrared optical system according to claim 1, wherein
the first and third lenses are each a plano-convex lens, the first lens has a convex surface that faces the object side, and the third lens has a convex surface that faces the image-surface side.

7. The infrared optical system according to claim 1, wherein the first and third lenses each include silicon.

8. An infrared imaging apparatus, comprising:
an infrared optical system including
a first lens, a second lens, and a third lens that are provided from an object side to an image-surface side, the first and third lenses being each configured as a spherical lens including an inorganic material and having a positive refractive power, the second lens being configured as a meniscus lens including a resin material and having aspherical surfaces, and
an aperture stop that is provided between any two of the first to third lenses;
an infrared detection section configured to detect infrared light gathered by the infrared optical system; and
an image signal obtaining section configured to obtain an infrared image signal based on an infrared detection signal obtained by the infrared detection section,
wherein the second lens is set to have a maximum ray length of a light ray of 2.0 mm or less, the light ray passing through the second lens for image formation.

9. The infrared imaging apparatus according to claim 8, wherein the second lens includes polyethylene.

10. The infrared imaging apparatus according to claim 8, further comprising a shutter positioned the aperture stop.

11. The infrared optical system according to claim 8, wherein the aperture stop is provided between the first and second lenses, the infrared optical system further comprising a shutter positioned the aperture stop.

12. The infrared imaging apparatus according to claim 8, wherein the first and third lenses are each one of a plano-convex lens and a meniscus lens.

13. The infrared imaging apparatus according to claim 8, wherein the first and third lenses are each a plano-convex lens, the first lens has a convex surface that faces the object side, and the third lens has a convex surface that faces the image-surface side.

14. The infrared imaging apparatus according to claim 8, wherein the first and third lenses each include silicon.

* * * * *